United States Patent
Cheng et al.

(10) Patent No.: US 11,558,143 B2
(45) Date of Patent: Jan. 17, 2023

(54) OAM MESSAGE TRANSMISSION METHOD AND TRANSMISSION DEVICE, AND STORAGE MEDIUM

(71) Applicants: CHINA MOBILE COMMUNICATION CO., LTD RESEARCH INSTITUTE, Beijing (CN); CHINA MOBILE COMMUNICATIONS GROUP CO., LTD., Beijing (CN)

(72) Inventors: Weiqiang Cheng, Beijing (CN); Han Li, Beijing (CN); Lei Wang, Beijing (CN)

(73) Assignees: CHINA MOBILE COMMUNICATION CO., LTD RESEARCH INSTITUTE, Beijing (CN); CHINA MOBILE COMMUNICATIONS GROUP CO., LTD., Beijing (CN)

( * ) Notice: Subject to any disclaimer, the term of this patent is extended or adjusted under 35 U.S.C. 154(b) by 68 days.

(21) Appl. No.: 16/648,579

(22) PCT Filed: Aug. 17, 2018

(86) PCT No.: PCT/CN2018/101192
§ 371 (c)(1),
(2) Date: Mar. 18, 2020

(87) PCT Pub. No.: WO2019/056899
PCT Pub. Date: Mar. 28, 2019

(65) Prior Publication Data
US 2020/0220650 A1    Jul. 9, 2020

(30) Foreign Application Priority Data
Sep. 21, 2017  (CN) .......................... 201710861368.0

(51) Int. Cl.
*H04L 1/00* (2006.01)
*H04L 41/0246* (2022.01)
(Continued)

(52) U.S. Cl.
CPC .......... *H04L 1/0023* (2013.01); *H04L 1/0008* (2013.01); *H04L 1/0057* (2013.01);
(Continued)

(58) Field of Classification Search
None
See application file for complete search history.

(56) References Cited

U.S. PATENT DOCUMENTS 5,764,626 A   6/1998 Vandervort
6,466,592 B1  10/2002 Chapman
(Continued)

FOREIGN PATENT DOCUMENTS

CN   1852215 A    10/2006
CN   101227450 A   7/2008
(Continued)

OTHER PUBLICATIONS

Han Li, China Mobile "5G Transport Network Requirements, Architecture and Key Technologies" WD1112, ITU-T Draft: Study Period 2017-2020: Study Group 15: Series WD1112. International Telecommunication Union, Geneva: CH, Oct. 13, 2017, XP044214380, 27 pages.
(Continued)

*Primary Examiner* — Adnan Baig
(74) *Attorney, Agent, or Firm* — BakerHostetler

(57) ABSTRACT

Disclosed in the embodiments of the present invention are an OAM message transmission method and transmission device, and a storage medium. The OAM message transmission method comprises: obtaining an OAM block generated on the basis of an OAM message; replacing an idle
(Continued)

block in a data stream with the OAM block; and sending the data stream carrying the OAM block.

18 Claims, 9 Drawing Sheets

(51) Int. Cl.
  *H04L 41/0631* (2022.01)
  *H04L 43/0811* (2022.01)
(52) U.S. Cl.
  CPC ...... *H04L 41/0246* (2013.01); *H04L 41/0631* (2013.01); *H04L 43/0811* (2013.01)

(56) References Cited

U.S. PATENT DOCUMENTS

| | | | |
|---|---|---|---|
| 6,687,225 | B1 | 2/2004 | Kawarai et al. |
| 6,700,873 | B1 | 3/2004 | Sugaya et al. |
| 2004/0085905 | A1* | 5/2004 | Lim .................. H04Q 11/0062 370/236.2 |
| 2004/0240478 | A1* | 12/2004 | Goren .................... H04J 3/073 370/503 |
| 2005/0102419 | A1 | 5/2005 | Popescu et al. |
| 2008/0228941 | A1 | 9/2008 | Popescu et al. |
| 2009/0190595 | A1* | 7/2009 | Jiang ................... H04L 25/4908 370/395.1 |
| 2012/0275783 | A1* | 11/2012 | Kitajima ............. H04J 14/0212 398/27 |
| 2013/0010600 | A1* | 1/2013 | Jocha ................... H04L 41/046 370/236.2 |
| 2016/0028586 | A1 | 1/2016 | Blair |
| 2017/0005901 | A1* | 1/2017 | Gareau .................. H04L 43/10 |
| 2017/0013532 | A1* | 1/2017 | Olofsson ............... H04W 36/38 |
| 2017/0093757 | A1 | 3/2017 | Gareau et al. |
| 2019/0280913 | A1* | 9/2019 | Huang .................... H04L 41/06 |
| 2020/0153720 | A1* | 5/2020 | Zhang .................... H04L 69/22 |

FOREIGN PATENT DOCUMENTS

| | | |
|---|---|---|
| CN | 101335750 A | 12/2008 |
| CN | 101436955 A | 5/2009 |
| CN | 101447975 A | 6/2009 |
| CN | 103823776 A | 5/2014 |
| CN | 106301678 A | 1/2017 |
| CN | 106411454 A | 2/2017 |
| CN | 106612220 A | 5/2017 |
| EP | 1001644 A2 | 5/2000 |
| EP | 1416761 A1 | 5/2004 |
| EP | 3113502 A1 | 1/2017 |
| EP | 3537655 A1 | 9/2019 |
| EP | 3675398 A1 | 7/2020 |
| JP | 2001024655 A | 1/2001 |
| JP | 2003069611 A | 3/2003 |
| JP | 2008124967 A | 5/2008 |

OTHER PUBLICATIONS

Chino et al., "Enhanced Network Signaling For 10 Gigabit Ethernet To Achieve a LAN-WAN Seamless Interface and Its Implementation in the PHY-LSI/Transceiver Module", International Journal of High Speed Electronics and Systems, vol. 15, No. 3, 2005, XP009072179, pp. 667-704.
Extended Search Report issued in European Application No. 18858412.2, dated Sep. 23, 2020.
English translation of International Search Report and Written Opinion issued in PCT/CN2018/101192, dated Nov. 2, 2018.

* cited by examiner

| 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 | 32 | 33 | 34 | 35 | 36 | 37 | 38 | 39 | 40 | 41 | 42 | 43 | 44 | 45 | 46 | 47 | 48 | 49 | 50 | 51 | 52 | 53 | 54 | 55 | 56 | 57 | 58 | 59 | 60 | 61 | 62 | 63 | 64 | 65 |
|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|
| 0x4B | | | | | | | | Data1 | | | | | | | | | | Data2 | | | | | | | | Data3 | | | | | | | | 0xC | | | | 0x0 | | | | Data4 | | | | | | | | Data5 | | | | | | | | Data6 | | | | | | |

FIG. 11

| 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 | 32 | 33 | 34 | 35 | 36 | 37 | 38 | 39 | 40 | 41 | 42 | 43 | 44 | 45 | 46 | 47 | 48 | 49 | 50 | 51 | 52 | 53 | 54 | 55 | 56 | 57 | 58 | 59 | 60 | 61 | 62 | 63 | 64 | 65 |
|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|
| 0x4B | | | | | | | | Resv | | | | Type | | | | Value 1 | | | | | | | | Value 2 | | | | | | | | | | | | 0xC | | | | 0x0 | | | | Value 3 | | | | | | | | Value 4 | | | | | | | Seq | | | | CRC4 | | |

FIG. 12

OAM MESSAGE TRANSMISSION METHOD AND TRANSMISSION DEVICE, AND STORAGE MEDIUM

CROSS-REFERENCE TO RELATED APPLICATIONS

This application is a National Stage of International Patent Application No. PCT/CN2018/101192, filed on Aug. 17, 2018, and claims priority to Chinese Patent Application No. 201710861368.0, filed on Sep. 21, 2017, the disclosures of which are hereby incorporated by reference in their entirety.

TECHNICAL FIELD

The disclosure relates, but not limited, to the technical field of communication, and particularly to an Operation Administration and Maintenance (OAM) message transmission method and transmission device, and a storage medium.

BACKGROUND

An OAM message is various information required to be transmitted in daily operation, administration and maintenance of an operating company over a network. How to implement transmission of an OAM message to minimize a perception of a user side to improve a user experience and transmit the OAM message without any dedicated transmission resource is a problem urgent to be solved in a conventional art.

SUMMARY

Embodiments of the disclosure are intended to provide an OAM message transmission method, a transmission device and a storage medium.

To this end, the technical solutions of the invention are implemented as follows.

A first aspect provides an OAM message transmission method, which may include the following operations.

An OAM block generated based on an OAM message is acquired.

An idle block in a data stream is replaced with the OAM block.

The data stream containing the OAM block is sent.

A second aspect provides an OAM message transmission method, which may include the following operations.

A data stream is received.

An OAM block is extracted from the data stream, the OAM block being a code block replacing an original idle block in the data stream.

A third aspect provides an OAM message transmission device, which may include an acquisition unit, a replacement unit and a sending unit.

The acquisition unit may be configured to acquire an OAM block generated based on an OAM message.

The replacement unit may be configured to replace an idle block in a data stream with the OAM block.

The sending unit may be configured to send the data stream containing the OAM block.

A fourth aspect provides an OAM message transmission device, which may include a receiving unit and an extraction unit.

The receiving unit may be configured to receive a data stream.

The extraction unit may be configured to extract an OAM block from the data stream, the OAM block being a code block replacing an original idle block in the data stream.

A fifth aspect provides a transmission device, which may include a transceiver, a memory, a processor and computer programs stored in the memory and executed by the processor.

The processor may be connected with the transceiver and the memory respectively, and may be configured to execute the computer programs to implement any OAM message transmission method provided in the first aspect or execute any OAM message transmission method provided in the second aspect.

A sixth aspect provides a computer storage medium, which may store computer programs, the computer programs being executed to implement any OAM message transmission method provided in the first aspect or execute any OAM message transmission method provided in the second aspect.

According to the OAM message transmission method, transmission device and storage medium provided in the embodiments of the disclosure and the OAM block is generated based on the OAM message, the idle block in the data stream is replaced with the OAM block, to generate the data stream containing the OAM block. The original idle block is a data block containing no information content required to be received by a receiver. In the embodiments of the disclosure, the idle block is replaced, and the OAM block is transmitted by use of a transmission resource transmitting the idle block. In the first aspect, it is apparent that allocation of a dedicated transmission resource for transmission of the OAM block is avoided and thus an effective utilization rate of the transmission resource is increased. In the second aspect, allocation of the dedicated transmission resource is avoided, and the idle block is replaced without increasing a parameter such as a length of the data stream and bringing other changes in transmission of the data stream, so that high compatibility with the conventional art and the characteristic of convenience for transmission are achieved.

BRIEF DESCRIPTION OF THE DRAWINGS

FIG. 11 is a structure diagram of an OAM block according to an embodiment of the disclosure.

FIG. 12 is a structure diagram of another OAM block according to an embodiment of the disclosure.

DETAILED DESCRIPTION

The technical solutions of the disclosure will be further described below in combination with the drawings of the specification and specific embodiments in detail.

Figures 1, 2:
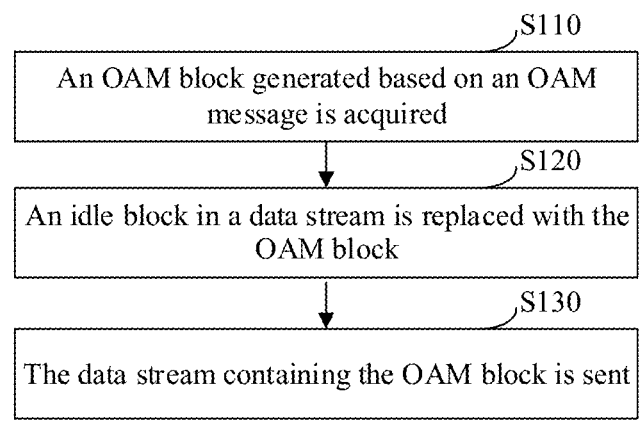
FIG. 1 is a flowchart of a first OAM message transmission method according to an embodiment of the disclosure.
FIG. 2 is a structure diagram of an O block according to an embodiment of the disclosure.

As shown in FIG. 1, an embodiment provides an OAM message transmission method, which includes the following steps.

In S110, an OAM block generated based on an OAM message is acquired.

In S120, an idle block in a data stream is replaced with the OAM block.

In S130, the data stream containing the OAM block is sent.

The OAM message transmission method in the embodiment is applied to a sending device of the OAM message.

In the embodiment, the operations may be executed by a Slicing Packet Network (SPN) channel layer of the Flexible Ethernet (FlexE). The SPN channel layer may also be called a FlexE path layer.

The data stream may be a data stream from a client, and the idle block is usually inserted into the data stream to solve the problem of inconsistent sending and receiving frequencies of a sender and a receiver. For example, if a sending rate of the sender is higher than a receiving rate of the receiver, the original idle block may be replaced with a data block containing a data content, thereby reducing data pileup of the sender. If the sending rate of the sender is lower than the receiving rate of the receiver, the idle block may be added to avoid an interrupt of the data stream, thereby keeping transmitting the data stream. The data stream may also be called a service data stream.

In S110, the OAM block containing at least part of a message content of the OAM message may be acquired according to the message content of the OAM message. Here, acquisition of the OAM block includes reception from a control device and also includes generation by itself according to the OAM message.

Here, a block length of the OAM block is equal to a block length of the idle block. The block length is a bit length of the corresponding block. For example, if the idle block is a 66 bit block, the OAM block is also a 66 bit block. Therefore, a change in a data volume of the data stream after replacement of the idle block with the OAM block may be avoided, and another non-idle block containing information would not be covered in a process of replacement with the OAM block. A typical non-idle block may include a starting (S) block identifying a starting position of a transmission cycle, a terminating (T) block identifying a terminating position of the transmission cycle and a data (D) block containing a data content.

In the embodiment, the OAM block may be encapsulated based on a Type, Length and Value (TLV) format, namely a type field indicating that it is an OAM block is encapsulated at a predetermined position of the OAM block, and then the receiver, when the field is detected, may know that the presently received block is the OAM block and know about fields or bits corresponding to the data length and attribute value of the OAM block. The attribute value may be a field and/or bit configured to contain a data content.

In the embodiment, the OAM block may contain an indication field of one or more OAM functions. When the indication field of OAM function is contained, one OAM block may be sent to trigger execution of multiple OAM functions, and the OAM functions may be any function related to OAM, for example, Connectivity Check (CC), delay check and/or various check functions. Multiple functions are triggered by one OAM block, so that the characteristic of high code block efficiency of the OAM block is achieved.

In the embodiment, the idle block is a code block containing no information content required to be received by the receiver. The idle block contains a type field indicating a type of the code block, so that the receiver or an SPN channel, after receiving the block, may extract the type field of the code block to determine whether the present code block is an idle block or not.

In the embodiment, when the OAM block is required to be sent and existence of the idle block in the data stream is detected, the idle block may be replaced with the generated OAM block. In such case, the OAM message is conveniently transmitted by use of the existing data stream, for example, a transmission resource corresponding to the idle block in the service data stream, so that configuration of a dedicated transmission resource for transmission of the OAM message is avoided, and an effective utilization rate of the transmission resource is increased. Meanwhile, a client may not perceive, and high compatibility with the conventional art is achieved.

In the embodiment, the OAM block includes a first-type OAM block that is sent according to a cycle and/or a second-type OAM block that is sent on demand. In the embodiment, the cycle of the OAM block may be called an OAM cycle.

S120 may include the following operation.

When a sending moment of the first-type OAM block is reached according to the cycle and the idle block exists in the data stream, the idle block is replaced with the first-type OAM block. For the first-type OAM block, a predetermined number of OAM blocks are required to be sent every other OAM cycle. Here, the predetermined number may be valued to be a positive integer such as 1, 2 or 3. The sending moment may be determined according to the OAM cycle. If the idle block exists in the data stream received by the SPN channel layer at the sending moment, the idle block at the sending moment is replaced with the first-type OAM block to accurately periodically send the first-type OAM block as much as possible and reduce an offset of the sending cycle of the first-type OAM block.

S120 may further include the following operation.

When the sending moment of the first-type OAM block is reached according to the cycle and the idle block does not exist in the data stream, a next idle block of the data stream is awaited, and the next idle block is replaced with the first-type OAM block. If the idle block does not exist in the data stream at the sending moment of the first-type OAM block, transmission of the data stream is awaited until the next idle block is received, and the next idle block is replaced with the first-type OAM block.

S120 may further include the following operation.

When the second-type OAM block that is sent on demand is sent, any one idle block in the data stream is replaced with the second-type OAM block.

The second-type OAM block is sent on demand and has no certain sending cycle. Whether the presently received data stream includes the idle block or not is started to be detected once the second-type OAM block is formed, and if YES, the idle block is directly replaced with the second-type OAM block.

In some embodiments, the first-type OAM block is an OAM block generated based on daily periodic maintenance, and the second-type OAM block is an OAM block generated based on a triggering event or an OAM block generated based on an instruction.

For example, the first-type OAM block includes at least one of a CC block, a signal quality check block, a Client Signal (CS) Local Failure (LF) indication block, a CS Remote Failure (RF) indication block, a CS power consumption indication block, a Remote Defect Indication (RDI) block or a Remote Error Indication (REI) block.

The CC block is configured to trigger the receiver and/or the sender to execute CC of a transmission link.

The signal quality check block is configured to trigger the receiver and/or the sender to execute check of signal quality, for example, check of a bit error rate and/or a code error rate.

The CS LF indication block is configured to indicate that a CS sending the OAM block fails. Here, the CS is a signal from the client.

The CS RF indication block is configured to indicate that a CS of an opposite end fails.

The second-type OAM block includes at least one of an Automatic Protection Switching (APS) block, a CS type indication block, a Connectivity Verification (CV) block, a one-way delay measurement block, a two-way delay measurement block or a two-way delay measurement response block.

The APS block is configured to instruct execution of an APS operation on the link, for example, automatic protection protocol-based link protection and/or switching.

The CS type indication block is configured to indicate a type of a CS that is presently transmitted.

The CV block is configured to indicate a code block checking connectivity of the transmission link.

The one-way delay measurement block is configured to indicate a code block executing delay measurement of a one-way link from the sender to the receiver or from the receiver to the sender.

The two-way delay measurement block is configured to indicate a code block of the sender for triggering delay measurement of a two-way link. The two-way link includes a transmission link from the sender to the receiver and then from the receiver to the sender.

The two-way delay measurement response block is configured to indicate a code block of the receiver for responding to delay measurement of the two-way link.

In some embodiments, the OAM block is divided into a unifunctional OAM block and a multifunctional OAM block according to an OAM function triggered to be executed. The multifunctional OAM block contains multiple fields, and these fields contain fields configured to trigger different OAM functions to be executed. For example, the fields may include at least one of an APS field, a CS type indication field, a CV field, a one-way delay measurement field, a two-way delay measurement field or a two-way delay measurement response block.

In some embodiments, S110 may include the following operation.

The operation that the OAM block generated based on the OAM message is acquired includes the following operation.

When a data length of the OAM message is not greater than a data length that the OAM block can carry, an independent OAM block is acquired.

In the embodiment, the independent OAM block may also be an individual OAM block, and is a code block carrying a complete OAM message.

The data length is the total number of bits therein. The data length of the OAM message may be the number of bits in the OAM message. The data length that the OAM block can carry may be the number of bits configured to contain the message content in the OAM block. For example, the OAM block includes 68 bits, only 48 bits being configured to carry the message content. If the total number of bits in the OAM message is greater than 48, the OAM message may not be encapsulated into the independent OAM block. If the total number of the bits in the OAM message is less than 48, it may be encapsulated into the independent OAM block.

Here, the operation that the independent OAM block is acquired may include that the independent OAM block is received from another device, and may also include that the OAM block is generated by itself.

In some other embodiments, S120 may include the following operation.

When the data length of the OAM message is greater than the data length that the OAM block can carry, multiple associated OAM blocks corresponding to the OAM message are acquired, each associated OAM block containing part of the message content of the OAM message and each associated OAM block containing a sequence number corresponding to the message content in the associated OAM block.

In the embodiment, if one OAM message has a relatively great data length and may not be completely carried in a single OAM block, it is required to split to be carried in the multiple associated OAM blocks. For making it convenient for the receiver to subsequently assemble the data contents, in the embodiment, the sequence numbers may be carried in the associated OAM blocks, the sequence numbers being related to the message contents in the OAM blocks. For example, the OAM message is split into S content segments according to continuity of the message content, the sth content segment being carried in the sth OAM block, and in such case, the sth OAM block contains a sequence number, and the sequence number points to the sth content segment. In such case, the receiver, after receiving S OAM blocks, may assemble the S content segments according to the sequence numbers, thereby obtaining the complete and correct message content of the OAM message. S is a positive integer, and s is a positive integer not greater than S. In the embodiment, the sequence number is contained at a predetermined position of the OAM block.

In some embodiments, S120 may include the following operation.

The idle block is replaced with the OAM block in combination with a time sequence and/or sending priority of the OAM block according to a predetermined strategy.

The time sequence of the OAM block may be a generation time sequence of the OAM block.

The time sequence may also be an acquisition time sequence for acquisition of the OAM block.

In the embodiment, the OAM block may be selected to replace the idle block in combination with the time sequence and/or the sending priority according to the predetermined strategy.

For example, S120 may include the following operation.

If the number of OAM blocks is not greater than the number of idle blocks, the OAM blocks are sequentially selected to replace the idle blocks according to the time sequences.

Here, the number of the OAM blocks is the number of OAM blocks presently to be sent, and the number of the idle blocks is the number of idle blocks detected in the data stream presently to be sent.

Here, the operation that the OAM blocks are selected to replace the idle blocks according to the time sequences may include the following operation.

The OAM blocks with early time sequences are preferably selected to replace the idle blocks according to the time sequences.

If the number of the idle blocks is relatively great and the number of the OAM blocks to be sent is relatively small, the idle blocks in the data stream may be sequentially replaced according to the time sequences, so that all the OAM blocks may be sent, and they are sent according to the time sequences.

If the number of the OAM blocks is greater than the number of the idle blocks, the OAM blocks for replacing the idle blocks are selected according to priorities.

S120 may further include the following operation.

If the number of the OAM blocks is greater than the number of the idle blocks, the OAM blocks with high sending priorities are selected to replace the idle blocks according to different sending priorities. If the multiple OAM blocks presently to be sent have different sending priorities, the OAM blocks with the high priorities are preferably sent, so that the OAM blocks with the high priorities are selected to replace the idle blocks in the data stream.

The sending priority may be related to one or more of parameters such as importance, emergency degree and transmission delay requirement of the message content of the OAM message.

In some other embodiments, S120 may further include that: if the number of the OAM blocks is greater than the number of the idle blocks and the OAM blocks to be sent have the same priority, the OAM blocks are selected to replace the idle blocks according to the time sequences.

Under the circumstance that the multiple OAM blocks presently to be transmitted have the same priority, for further solving the problem of conflicts, the OAM blocks with the early time sequences are selected to replace the idle blocks according to the time sequences.

In some other embodiments, S120 may include the following operation.

If the number of the OAM blocks is greater than the number of the idle blocks and the OAM blocks have the same priority, the OAM blocks are randomly selected to replace the idle blocks until all the OAM blocks are sent.

In some embodiments, the OAM block includes at least one of the following fields:
 a type field, configured to indicate an OAM block type;
 a sending priority field, configured to indicate the sending priority of the OAM block;
 a sequence number field, configured to indicate the sequence number of the OAM block;
 a first check field, configured to carry a first check code, the first check code being configured to check the OAM block; and
 a message field, configured to carry the message content of the OAM message.

In some embodiments, the OAM block at least includes a first-type field and a second-type field, the first-type field being a required field and the second-type field being an optional field.

In some embodiments, the first-type field may include the type field and the message field. In some other embodiments, the first-type field may include the type field, the message field and the first check field.

The second-type field may include the sequence number field, the sending priority field and the like.

For example, the independent OAM block may not include the sequence number field, and the associated OAM block is required to include the sequence number field. For the independent OAM block, the sequence number field is a second-type field. For the associated OAM block, the sequence number field is a first-type field.

In a word, the first-type field and the second-type field may be distinguished according to an attribute of the present OAM block. The attribute may include one or more of the message content of the OAM message, an association relationship with another OAM block and the like.

In some embodiments, the OAM block may further include a second check field. The second check field contains a second check code, and the second check code may be configured to check code blocks transmitted in first m transmission cycles.

In some embodiments, S110 may include the following operation.

An OAM block encapsulated according to an encapsulation format of a predetermined-type block is acquired, the OAM block being a code block encapsulated with the message content of the OAM message by taking a field as a basic unit.

In the embodiment, when the message content of the OAM message is encapsulated into the OAM block, the field is taken as the basic unit for encapsulation. A field includes 8 bits. In such case, no matter whether the code block in the data stream is a 32 bit code block or a 66 bit code block, high compatibility may be achieved, so that the problem of encapsulated bit conflicts may be solved.

In some embodiments, the predetermined-type block is an O block, and the O block includes 8 bytes, i.e., zeroth to seventh bytes respectively. In the embodiment, the O block is a code block in a predetermined format.

The operation that the OAM block encapsulated according to the encapsulation format of the predetermined-type block is acquired, the OAM block being a code block encapsulated with the message content of the OAM message by taking a byte as the basic unit, includes the following operation.

An OAM block encapsulated according to an encapsulation format of an O block is acquired, the message content of the OAM message being added into first to third bytes and fifth to seventh bytes of the O block.

FIG. 2 illustrates the code block format of the O block. Repeated numbers 0, 1, 2 . . . 9 in FIG. 2 are adopted to count bits in the O block. It is apparent that the O block shown in FIG. 2 includes 66 bits. The O block includes the 66 bits. The first two bits being synchronous bits, and are usually fixed values "10". The other 64 bits of the O block are split into 8 bytes, i.e., D0, D1, D2, D3, D4, D5, D6 and D7 respectively. The zeroth byte (D0) contains a type byte indicating a type of the code block, and a type value of the O block is 0x4B and is contained in the zeroth byte of the code block. A first half of the fourth byte (D4) has been occupied, and only a second half is left. In the embodiment, the message content of the OAM message is contained only in D1, D2, D3, D5, D6 and D7, or, the content of the OAM block is contained only in D1, D2, D3, D5, D6 and D7. The content in the OAM block is encapsulated by taking 8 bits, i.e., a byte, as the basic unit.

In the embodiment, the first row and second row in FIG. 2 illustrate the untransformed O block, and all D5, D6 and D7 of the untransformed O block are usually all-zero fields. In the embodiment, if the OAM block is encapsulated according to the encapsulation format of the O block, D5, D6 and D7 may contain the content of the OAM block, specifically as shown in the third row in FIG. 2. In such case, the receiver may distinguish whether the presently received O block is an existing O block or an O block obtained by transformation, i.e., the OAM block, according to the contents contained in D5, D6 and D7.

In the embodiment, the OAM block is encapsulated by use of the format of the existing O block. In one aspect, setting of a dedicated encapsulation format for encapsulation of the OAM block is avoided, so that simplicity for implementation is achieved; and the receiver is not required to master a completely new analysis manner for analyzing the OAM block, so that high compatibility with the conventional art is achieved. In the other aspect, the OAM block is encapsulated by use of the encapsulation format of the O block and the characteristic that D5, D6 and D6 of the existing O block are all-zero is utilized, so that the receiver may conveniently distinguish the original O block and the O block obtained by transformation based on the information contents in D5, D6 and D7; and in such a manner, the untransformed O block may also be distinguished from the O block obtained by transformation by use of the characteristic of the O block, so that confusion is avoided.

S110 may include the following operation.

An OAM block generated based on the second check code and the OAM message is acquired, the second check code being generated based on a code block of an nth transmission cycle, the acquired OAM block being configured to replace an idle block of an (n+m)th transmission cycle, n being a positive integer and m being a positive integer.

In the embodiment, the transmission cycle is different from the sending cycle of the OAM block (i.e., the OAM cycle). In the embodiment, the number of code blocks involved in interaction between the sender and the receiver in a transmission cycle is fixed.

Figure 3:
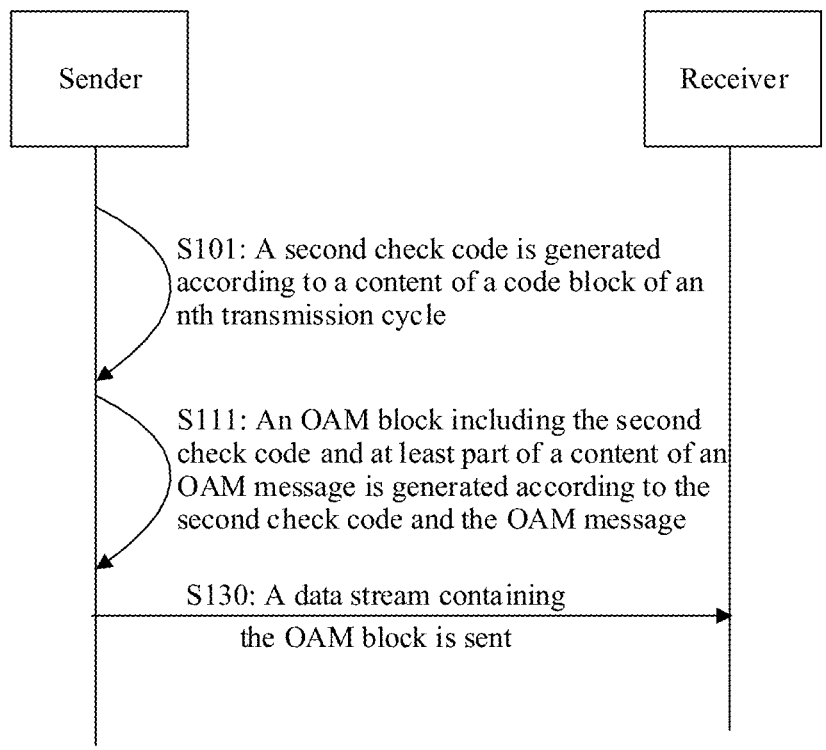
FIG. 3 is a flowchart of a second OAM message transmission method according to an embodiment of the disclosure.

In some embodiments, as shown in FIG. 3, the method further includes the following operation.

In S101, the second check code is generated according to a content of the code block of the nth transmission cycle.

S110 may include S111. S111 may include the following operation.

An OAM block including the second check code and at least part of the content of the OAM message is generated according to the second check code and the OAM message.

For example, in the embodiment, a network device such as the SPN channel layer generates the second check code based on contents of all code blocks in the nth transmission cycle and sends it to the receiver in the OAM block in the (n+m)th transmission cycle.

In some other embodiments, the OAM block containing the second check code may directly be received from the other device in S110.

In a word, since the OAM block contains the second check block or is generated based on the second check code, the OAM message transmission method provided in the embodiment may further be adopted to transmit the second check code. The second check code may be a parity check code, and for example, may be a Bit Interleaved Parity (BIP) code configured for the receiver to check receiving accuracy of all the code blocks in the nth transmission cycle.

m is a positive integer, and is optionally valued to be 1, 2 or 3, etc.

In the embodiment, the second check code is sent in the data stream in the (n+m)th transmission cycle, so that enough time is provided for generation of the second check code, a performance requirement for generation of the second check code is reduced, and high compatibility with the conventional art is achieved.

In some embodiments, the OAM block includes the first-type OAM block that is sent according to the cycle and/or the second-type OAM block that is sent on demand.

S110 may include the following operation.

The first-type OAM block generated based on the second check code and the OAM message is acquired.

In the embodiment, the first-type OAM block is periodically sent, and the second check code is also required to be periodically sent due to check continuity, so that sending the second check code in the first-type OAM block may ensure that the second check code is continuously sent, and if it is born in the second-type OAM block that is sent on demand, relatively high randomness may cause randomness and instability of check based on the second check code.

Figure 4:
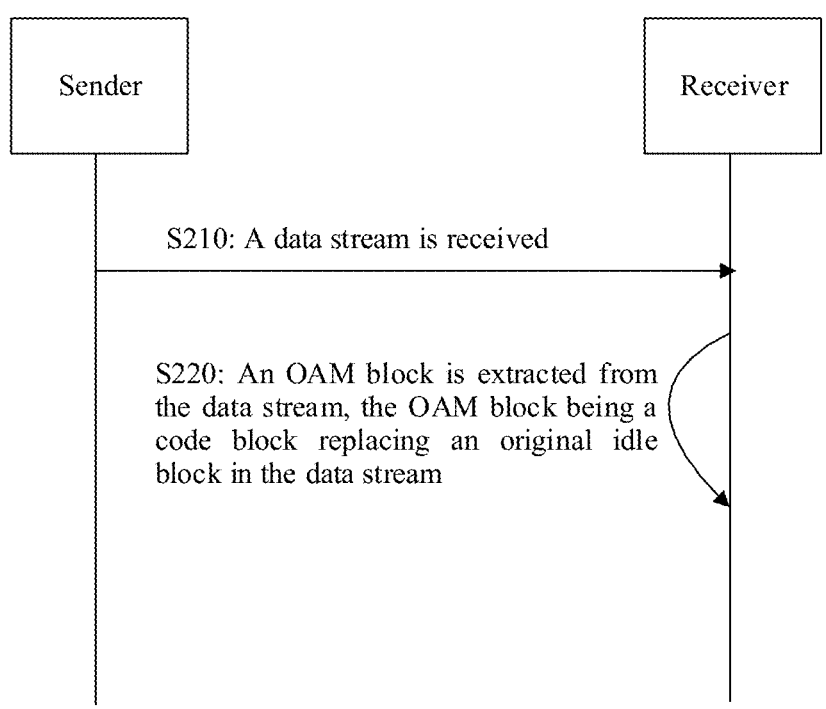
FIG. 4 is a flowchart of a third OAM message transmission method according to an embodiment of the disclosure.

As shown in FIG. 4, an embodiment provides an OAM message transmission method, which includes the following steps.

In S210, a data stream is received.

In S220, an OAM block is extracted from the data stream, the OAM block being a code block replacing an original idle block in the data stream.

The OAM message transmission method provided in the embodiment is a method applied to a receiving device.

In the embodiment, the data stream contains the OAM block. The receiving device may be an SPN device. After the data stream is received, the data stream is analyzed, and the OAM block in the data stream may be recognized according to an encapsulation format of the OAM block and/or a type field of the OAM block.

The OAM block may be extracted in S220. The OAM block replaces the original idle block in the data stream, namely a position occupied by the OAM block is originally a position occupied by the idle block in the data stream. The characteristics of high effective utilization rate of a transmission resource and high compatibility with the conventional art are also achieved.

In some embodiments, the method further includes the following operation.

When the OAM block includes a sequence number, contents of multiple OAM blocks are assembled according to sequence numbers to obtain an OAM message corresponding to the multiple associated OAM blocks.

When an OAM block contains a sequence number or a sequence number field is not null, the multiple OAM blocks may be received according to the sequence numbers, and the contents of the multiple OAM blocks may be sequentially assembled according to the sequence numbers to obtain the complete and correct OAM message.

In some embodiments, the method further includes the following operations.

A second check code is extracted from an OAM block of an (n+m)th transmission cycle.

The second check code is compared with a third check code locally generated based on a code block of an nth transmission cycle.

Transmission quality of the nth transmission cycle is determined according to a comparison result.

The second check code is extracted from OAM blocks of last m transmission cycles, and the second check code may be configured to be compared with the third check code that is locally generated to complete evaluation of the transmission quality of the nth transmission cycle.

In some embodiments, the operation that the second check code is extracted from the OAM block of the (n+m)th transmission cycle includes the following operation.

The second check code is extracted from a first-type OAM block of the (n+m)th transmission cycle.

In some embodiments, the OAM block containing the second check code further contains a number field indicating the number of the multiple associated OAM blocks corresponding to the OAM message.

The method further includes the following operation.

Whether the associated OAM blocks are completely received or not, for example, whether the problems of missing and the like appear or not, is judged according to the number field.

Figure 5:
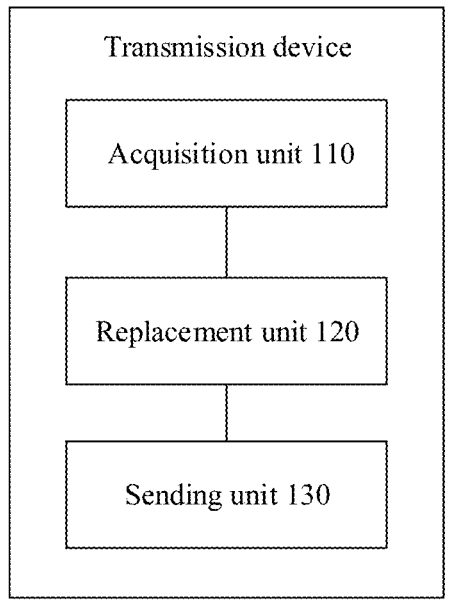
FIG. 5 is a structure diagram of a transmission device according to an embodiment of the disclosure.

As shown in FIG. 5, an embodiment provides an OAM message transmission device, which includes an acquisition unit 110, a replacement unit 120 and a sending unit 130.

The acquisition unit 110 is configured to acquire an OAM block generated based on an OAM message.

The replacement unit 120 is configured to replace an idle block in a data stream with the OAM block.

The sending unit 130 is configured to send the data stream containing the OAM block.

The transmission device provided in the embodiment may be a sending device of the OAM block.

The acquisition unit 110 may be a receiving interface, and may receive the OAM block that has been generated from another device. Or, the acquisition unit 110 may correspond to a processor, and may independently generate the OAM block based on the OAM message.

The replacement unit 120 may correspond to the processor, and replaces the idle block in the data stream received from a client with the OAM block.

The sending unit 130 may correspond to a sending interface, for example, a FlexE interface, and may be configured to send the data stream containing the OAM block.

In some embodiments, the OAM block includes a first-type OAM block that is sent according to a cycle and/or a second-type OAM block that is sent on demand.

In some embodiments, the replacement unit 120 may be configured to execute at least one of the following operations.

When a sending moment of the first-type OAM block is reached according to the cycle and the idle block exists in the data stream, the idle block is replaced with the first-type OAM block.

When the sending moment of the first-type OAM block is reached according to the cycle and the idle block does not exist in the data stream, a next idle block of the data stream is awaited, and the next idle block is replaced with the first-type OAM block.

When the second-type OAM block that is sent on demand is sent, any one idle block in the data stream is replaced with the second-type OAM block.

In some embodiments, the first-type OAM block is an OAM block generated based on daily periodic maintenance, and the second-type OAM block is an OAM block generated based on a triggering event or an OAM block generated based on an instruction.

For example, the first-type OAM block includes at least one of a CC block, a signal quality check block, a CS LF indication block, a CS RF indication block, a CS power consumption indication block, an RDI block or an REI block.

For another example, the second-type OAM block includes at least one of an APS block, a CS type indication block, a CV block, a one-way delay measurement block, a two-way delay measurement block or a two-way delay measurement response block.

In some embodiments, the acquisition unit 110 may be configured to, when a data length of the OAM message is not greater than a data length that the OAM block can carry, acquire an independent OAM block.

In some embodiments, the acquisition unit 110 may further be configured to, when the data length of the OAM message is greater than the at a length that the OAM block can carry, acquire multiple associated OAM blocks corresponding to the OAM message, each associated OAM block containing part of a message content of the OAM message and each associated OAM block containing a sequence number corresponding to the message content in the associated OAM block.

In some embodiments, the replacement unit 120 may be configured to select the OAM block to replace the idle block in combination with a time sequence and/or sending priority of the OAM block according to a predetermined strategy.

In some embodiments, the replacement unit 120 may be configured to, if the number of OAM blocks is not greater than the number of idle blocks, sequentially select the OAM blocks to replace the idle blocks according to time sequences.

For example, the replacement unit 120 may be configured to, if the number of the OAM blocks is greater than the number of the idle blocks, select the OAM blocks with high sending priorities to replace the idle blocks according to different sending priorities and/or, if the number of the OAM blocks is greater than the number of the idle blocks and the OAM blocks to be sent have the same priority, select the OAM blocks to replace the idle blocks according to the time sequences.

In some other embodiments, the OAM block includes at least one of the following fields:

a type field, configured to indicate an OAM block type;

a sending priority field, configured to indicate the sending priority of the OAM block;

a sequence number field, configured to indicate the sequence number of the OAM block;

a first check field, configured to carry a first check code, the first check code being configured to check the OAM block; and a message field, configured to carry the message content of the OAM message.

Furthermore, the acquisition unit 110 is specifically configured to acquire an OAM block encapsulated according to an encapsulation format of a predetermined-type block, the OAM block being a code block encapsulated with the message content of the OAM message by taking a field as a basic unit.

In some embodiments, the predetermined-type block is an O block, and the O block includes 8 bytes, i.e., zeroth to seventh bytes respectively.

The acquisition unit 110 is specifically configured to acquire an OAM block encapsulated according to an encapsulation format of the O block, the message content of the OAM message being added into first to third bytes and fifth to seventh bytes of the O block.

In some embodiments, the acquisition unit 110 may be configured to acquire an OAM block based on a second check code and the OAM message, the second check code being generated based on a code block of an nth transmission cycle, the acquired OAM block being configured to replace an idle block of an (n+m)th transmission cycle, n being a positive integer and m being a positive integer.

In some embodiments, the OAM block includes the first-type OAM block that is sent according to the cycle and/or the second-type OAM block that is sent on demand; and the acquisition unit 110 may be configured to acquire the first-type OAM block generated based on the second check code and the OAM message.

Figure 6:
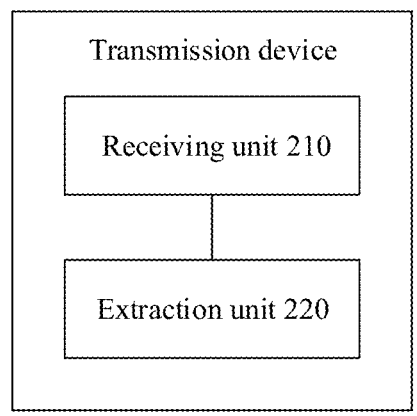
FIG. 6 is a structure diagram of another transmission device according to an embodiment of the disclosure.

As shown in FIG. 6, an embodiment provides an OAM message transmission device, which includes a receiving unit 210 and an extraction unit 220.

The receiving unit 210 may be configured to receive a data stream.

The extraction unit 220 may be configured to extract an OAM block from the data stream, the OAM block being a code block replacing an original idle block in the data stream.

The receiving unit 210 may correspond to a receiving interface, for example, a FlexE interface, and may be configured to receive the data stream containing the OAM block.

The extraction unit 220 may correspond to a processor, and may be configured to extract the OAM block from the data stream. In the embodiment, the data stream containing the OAM block is generated by replacing the idle block in the data stream containing no OAM block.

In some embodiments, the transmission device further includes an assembling unit.

The assembling unit corresponds to the processor, and may be configured to, when the OAM block includes a sequence number, assemble contents of multiple OAM blocks according to sequence numbers to obtain an OAM message corresponding to the multiple associated OAM blocks.

In some embodiments, the extraction unit 220 may further be configured to extract a second check code from an OAM block of an (n+m)th transmission cycle.

The transmission device further includes a check unit and a determination unit.

The check unit may be configured to compare the second check code and a third check code locally generated based on a code block of an nth transmission cycle.

The determination unit may be configured to determine transmission quality of the nth transmission cycle according to a comparison result.

The check unit and the determination unit may correspond to the processor.

In the embodiment of the disclosure, the processor may be a device and/or structure capable of implementing information processing, for example, a central processing unit, a microprocessor, a digital signal processor, an application processor, a programmable array and an application-specific integrated circuit.

Figure 7:
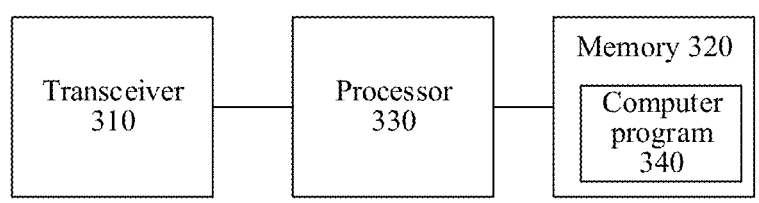
FIG. 7 is a structure diagram of another transmission device according to an embodiment of the disclosure.

As shown in FIG. 7, an embodiment provides an electronic device. The electronic device may be the abovementioned sending device and receiving device or a control device, and includes a transceiver 310, a memory 320, a processor 330 and computer programs 340 stored in the memory 320 and executed by the processor 330.

The processor 330 is connected with the transceiver 310 and the memory 320, and is configured to execute the computer programs 340 to control information transmission and reception of the transceiver 310 and information storage of the memory 320 and implement the OAM message transmission methods provided in one or more abovementioned technical solutions, for example, executing the OAM message transmission method applied to the sending device or executing the OAM message transmission method applied to the receiving device.

The transceiver 310 may correspond to a wired interface or a wireless interface. The wired interface may be a cable interface or an optical cable interface. The wireless interface may be a transceiver antenna.

The processor 330 may be a central processing unit 330, a microprocessor 330, a digital signal processor 330, an application processor 330, a programmable array or an application-specific integrated circuit, etc.

The processor 330 may be connected with the transceiver 310 and the memory 320 through a communication bus such as an integrated circuit bus respectively, and reads and executes the computer programs stored in the memory 320 to control information transmission and reception of the transceiver 310 and information storage of the memory 320 and implement the OAM message transmission methods provided in one or more abovementioned technical solutions.

An embodiment of the disclosure also provides a computer storage medium, which stores computer programs, the computer programs being executed by a processor to execute and implement the data transmission methods provided in one or more abovementioned technical solutions, for example, executing the data transmission method applied to a sending device or executing the data transmission method applied to a receiving device. Specifically, at least the OAM message transmission method shown in the figure may be executed.

The computer storage medium provided in the embodiment of the disclosure includes various media capable of storing program codes such as a mobile storage device, a Read-Only Memory 320 (ROM), a Random Access Memory 320 (RAM), a magnetic disk or a compact disc. Optionally, the computer storage medium may be a non-transitory storage medium. Here, the non-transitory storage medium may also be called a nonvolatile storage medium.

Some specific examples will be provided below in combination with any embodiment.

Example 1

An SPN channel layer inserts/extracts OAM on demand during multiplexing and demultiplexing between an SPN client layer and a channel, the client layer may not perceive in a service, the SPN channel T is supported to transmit an OAM message to enable/disable an OAM function (enabling/disabling for each type of OAM), and no OAM insertion/extraction operation is executed under a disabling circumstance.

Figure 8:
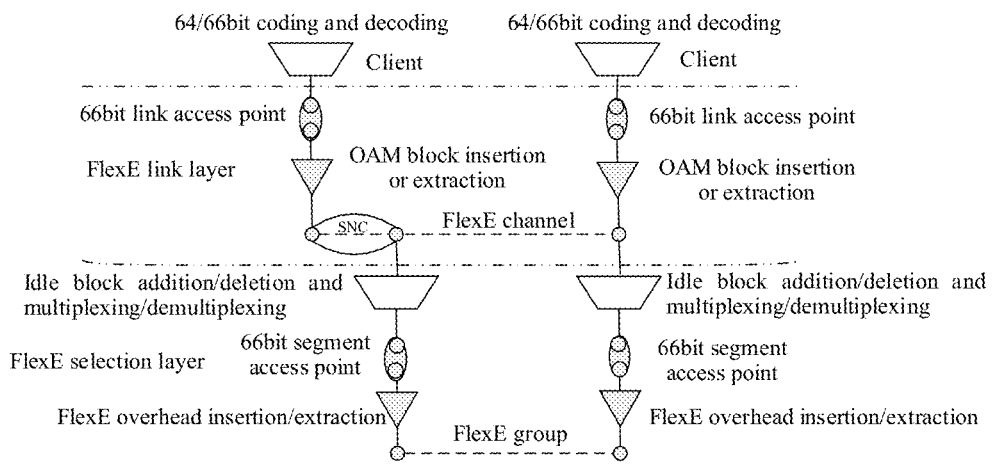
FIG. 8 is a schematic diagram of inserting and extracting an OAM block according to an embodiment of the disclosure.

As shown in FIG. 8, an OAM message is inserted or extracted in a FlexE link layer (corresponding to the SPN channel layer), and the OAM message may be inserted through an OAM block of which a data length is 66 bits.

For avoiding influence of OAM message insertion/extraction of the SPN channel layer on a user service and perception of a user in the service, it is required that when the OAM message is inserted, the OAM message is sent by replacing an idle block in a service flow. An idle block is added after the OAM message is extracted. Availability of an idle resource is required to be considered for an OAM sending frequency and the number of inserted OAM messages. The following factors are considered.

(1) Full-flow sending of the service of the client layer of the SPN channel is supported;

(2) A 9,600-field giant frame of the service of the client layer is supported.

(3) A ±100 ppm frequency offset of an Ethernet port is supported.

Figure 9:
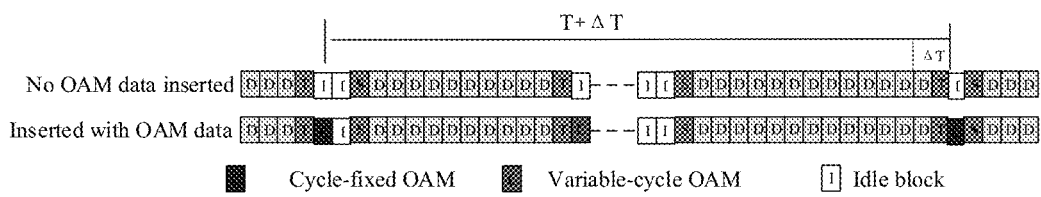
FIG. 9 is a schematic diagram of transmitting an OAM block according to an embodiment of the disclosure.

An OAM message sent and received according to a certain cycle may be sent after replacement only when there is an idle resource, and thus there is a certain deviation relative to a configured accurate cycle. In a scenario shown in FIG. 9, compatibility with such a deviation is required to be considered for an OAM function of the SPN channel layer.

T is absolute time, and different transmission cycles may be set. The transmission cycle that may be set includes:

16 k blocks, each block being a code block with a predetermined length of only one bit;

64 k blocks;

256 k blocks; and 512 k blocks.

It is to be noted that k=1,024 bits.

For an OAM message sent and received according to a non-fixed cycle, the following cycle may be set for OAM sending of a sending side, a default cycle being 10 s:

1 s;

10 s; and 1 min.

A Cyclic Redundancy Check (CRC) mechanism is required by the OAM message transmitted by the SPN channel, and only OAM passing CRC is extracted and processed. Here, CRC may be the abovementioned first check code, and is a check code only checking a corresponding code block.

An OAM message transmission requirement of the SPN channel is required to refer to the Institute of Electrical and Electronic Engineers (IEEE) 802.3-2015 standard.

The following OAM functions are supported by the SPN channel.

CC is supported.

Connectivity confirmation is supported.

Bit error check is supported.

REI is supported.

RDI is supported.

Delay measurement is supported, including one-way delay measurement (1DM) and/or two-way delay measurement (2DM).

APS is supported.

CS type is supported.

CS failure indication is supported.

Besides the abovementioned OAM functions, OAM of the SPN channel is required to be extensible.

Figure 10:
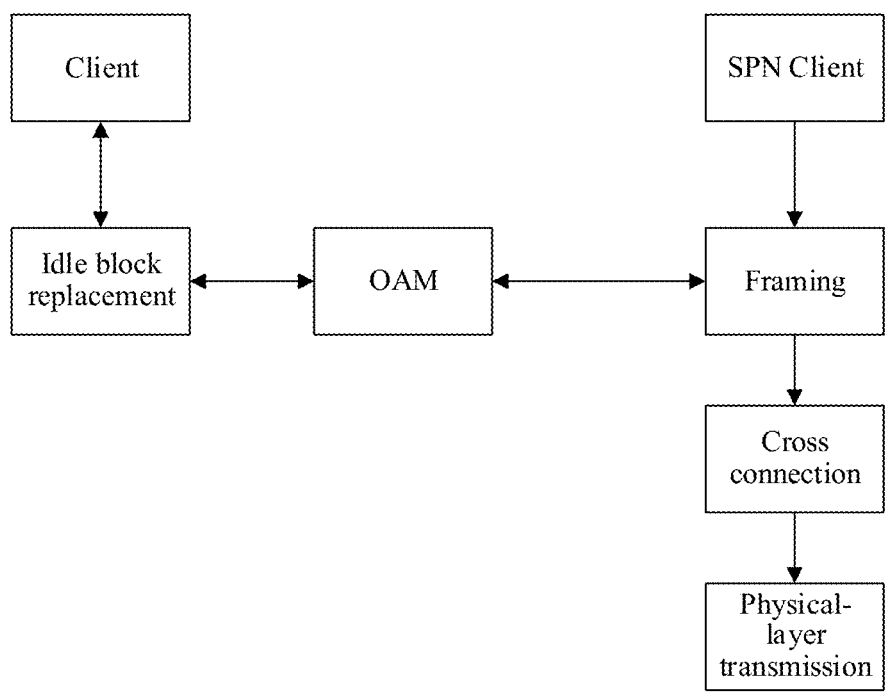
FIG. 10 is another schematic diagram of replacement with an OAM block according to an embodiment of the disclosure.

A flowchart of transmitting an OAM message by the SPN channel may be shown in FIG. 10.

The SPN, after receiving a data stream from the client, inserts an OAM block into an idle block containing no message in the data stream and then sends it. In such a manner, the OAM block may be transmitted in the data stream, an effective utilization rate of a resource is increased, high compatibility with transmission of service data of a user layer is achieved, and the user may not perceive.

A mechanism of replacing the idle block is adopted for OAM of the SPN channel, OAM with a fixed cycle is regularly sent in time T+ΔT, and OAM without a fixed cycle is sent at a position where it is required to be sent and there is an idle block.

The OAM block of the SPN channel layer may be defined as follows.

The OAM message of the SPN channel layer is carried in a 66 bit control block, and a default format specification of the 66 bit control block is shown in FIG. 11.

The OAM block of the SPN channel layer is distinguished by an 0 code in a 0x4B control block, the O code adopts 0xC as a default, and that the O code may be set to be supported.

For OAM of the SPN channel layer, the OAM message is carried in six data (D) blocks in the control block, specifically as shown in FIG. 12.

A specific field format of the OAM block may be as follows:

0x4B: it is 8 bit and, as a block type field, represents that the block is an O block type;

a reserved (Resv) field: it includes totally 2 bits, is a reserved field and adopts 0b00 as a default;

a type field: it includes totally 6 bits and identifies different OAM function types;

a value field: it includes totally 32 bits and indicates a content of an OAM message of a specific type;

a C code field: it includes totally 4 bits, adopts 0xC as a default, supports setting and represents that the SPN channel layer supports OAM message transmission;

a sequence number (Seq) field: it includes totally 4 bits and identifies sequence numbers of multiple OAM blocks adopted for the same OAM function or OAM message, Seq being required to be valued within the definition in the specification otherwise the block is an illegal block; and a check field (for example, CRC4 field): it includes totally 4 bits and checks a 4 bit CRC of the OAM block (except CRC4) transmitted by the SPN (a synchronous header is not checked). All OAM blocks are valid only when passing CRC. An algorithm polynomial is $X^4+x+1$ and an initial value is 0. All the OAM blocks are valid only when passing CRC.

Under some circumstances, the check code may be a 4 bit CRC, called as CRC4 for short. CRC is performed on a data field 1 (Data1) to data field 6 (Data6) of the OAM block (except CRC4) of the SPN (it is to be noted that the synchronous header in the OAM block is not checked). All the OAM blocks are valid only when passing CRC. The algorithm polynomial is $X^4+x+1$ and the initial value is 0. A position of a CRC result [X4:X0] in the code block is [second bit:65th bit]. All the OAM blocks are valid only when passing CRC.

A sending sequence of all the OAM blocks is kept consistent with the standard. Under a normal circumstance, the 66 bits of the OAM block are sequentially arranged from the zeroth bit to the 65th bit and the zeroth bit is sent at first, namely the lower bits are before the higher bits. For a coding sequence of a byte, the higher and lower bits correspond one to one. For example, the seventh bit of 0x4B except the synchronous header is in a placement position of the ninth bit in the 66 bit code block, and the zeroth bit except the synchronous header is in a placement position of the second bit in the 66 bit code block.

The sending sequence of all the OAM blocks is kept consistent with the standard (arrangement of bits 0~65 in the 66 bit block is specified in the OIF FlexE 2.0 draft Figure-17, bit 0 of the data part is sent at first, namely the lower bits are before the higher bits, and bit 3 of a CRC part is sent at first, namely the higher bits are before the lower bits).

The OAM block transmitted by the SPN channel is classified as follows.

According to a message insertion type, the OAM block of the SPN channel layer is divided into the following types.

(1) A fixed reference cycle-based inserted OAM type mainly includes CC (connectivity check), BIP (BIP check), CS_LF (client signal local failure), CS_RF (client signal remote failure), CS_LPI (client signal low-power indication). The OAM block of this type is sent in a FlexE client according to a fixed reference cycle (a shortest cycle is 16K 66 bit Ethernet blocks and may support setting).

(2) An event-triggered inserted OAM type mainly includes APS (automatic protection switching) and CS (client signal indication). OAM of this type is triggered by a related event, and the OAM block may be triggered to be sent immediately after the event occurs. Under a normal circumstance, it is sent according to a specified cycle, the cycle being usually more than or equal to 1 s.

(3) An on-demand OAM function mainly includes CV (connectivity verification), 1DM (one-way delay measurement), 2DM (two-way delay measurement) and 2DMR (two-way delay measurement response). The OAM block with the on-demand OAM function is required to be enabled, is inserted on demand in the FlexE client and may also be continuously inserted according to a specified cycle. The supported cycle is usually more than or equal to 1 s.

An extension mechanism for transmission of the OAM block of the SPN channel layer may be as follows.

The OAM message of the SPN channel layer is transmitted through the 66 bit OAM block and sent in a TLV format.

For OAM, construction of an OAM block may further refer to the following principles.

1: one OAM block may be inserted every other 16K blocks.

2: BIP calculation: a second BIP check result, and all code blocks between two BIP overhead blocks (including data code blocks, idle blocks, ordersets, client-layer OAM and the like that whether to check the configuration is supported).

4: APS: both ends of APS are required to supplement a confirmation mechanism and the sending cycle (three frames are sent at a high speed: at an interval of 16K blocks, and then frames are sent according to a is cycle).

5: Check of a version number is added to OAM, and the type is independently defined (for adaptation of the two ends and partially reserved).

The OAM function that the OAM message of the SPN channel layer may be realized may be defined as follows.

The OAM message of the SPN channel layer is divided into an alarming related OAM message, a performance related OAM message and other three main types of OAM messages.

The OAM function may support functions of CC, CV, REI, RDI, DM, BIP, APS, CSF, CS, AIS, LCK, LM, TEST, LB, LT and the like.

The OAM message is transmitted through a 66 bit block, and the 66 bit block follows the 64/66 coding standard, adopts a "C" block format and is extended (in green): the first field adopts 0x4B as the block control type and the first four bits of the fifth field adopt 0xC (a binary form is 0b1100) as an identifier of the OAM block. The specific format is as follows.

| Bit 0-1 | 2-9 | 10-11 | 2-17 | 18-25 | 26-33 | 34-37 | 38-41 | 42-49 | 50-57 | 8-61 | 2-65 |
|---|---|---|---|---|---|---|---|---|---|---|---|
| Sync 10 | Field 0 4B | Fied 1 Resv | Type | Field 2 D1 | Field 3 D2 | 0xC | Field4 Res:0x0 | Field 5 D3 | Field 6 D4 | SEQ | Field 7 CRC4 |

Since OAM messages that may be carried in an Ethernet block are limited, part of OAM messages are required to be split into multiple blocks for sending.

The OAM block of the SPN channel layer may adopt a single-block manner and a multi-block manner. The single-block manner refers to one of the abovementioned independent OAM block. The multi-block manner may refer to a manner of generating the abovementioned associated OAM blocks.

In the single-block manner, a complete OAM function is represented with an independent block.

In the multi-block manner, a complete OAM function is represented with a combination of multiple blocks.

In the multi-block manner, sequence numbers (Seq) are required to be added into the OAM blocks for combining the OAM function including multiple blocks.

The OAM block of the SPN channel layer has a sending priority.

Since various OAM function have different importance and real-time performance, sending priorities of OAM blocks of the SPN channel layer are required to be distinguished for transmission. OAM is divided to have high and low sending priorities. In a process of sending OAM blocks with second sending priorities in a queue, once a block with a first sending priority is required to be sent, the block with the first sending priority is preferably sent. That is, the sending priority is a transmission sending priority, and is related to importance and real-time performance requirement of the OAM function indicated by the OAM message.

In the OAM block, TYPE represents the OAM message type with 6 bits.

SEQ is a sequence number value and continuously adopts from 0 to 15.

CRC4 (polynomial $X4+X+1$) is a check result, i.e., a result obtained by checking 60 bits of field 0 to field 7 in the OAM block. Four fields D1-D4 are configured to transmit the OAM message. The Resv part is the reserved field.

The TYPE field is defined in the following table.

| OAM function | Type definition | Sending priority | OAM type | Descriptions |
|---|---|---|---|---|
| BAS | 0x1 | High | Single-block | Basic block, configured to send a basic OAM message in real time and including CC, BIP check, RDI, REI, CS_LF and CS_RF functions |
| APS | 0x2 | High | Single-block | APS message block, configured for APS |
| CV | 0x11 | Low | Multi-block | CV block, configured for CV |
| 1DM | 0x12 | Low | Multi-block | One-way delay block, configured to send a one-way delay measurement message |

-continued

| OAM function | Type definition | Sending priority | OAM type | Descriptions |
|---|---|---|---|---|
| 2DMM | 0x13 | Low | Multi-block | Two-way delay measurement block, configured to send a two-way delay measurement message |

| | Format of the OAM code block | 10 | 0x4B | | D1 | D2 | D3 | O0 | 0x00 | D4 | D5 | | D6 |
|---|---|---|---|---|---|---|---|---|---|---|---|---|---|
| Type | Priority | 10 | 0x4B | Resv [bit 7:6] | TYPE [bit5:0] | Value1 [bit7:0] | Value2 [bit7:0] | 0xC [bit7:4] | 0x00 [bit3:0] | Value 3 [bit7:0] | Value4 [bit7:0] | Seq [bit 7:4] | CRC4 [bit3:0] |
| BAS | H | 10 | 0x4B | 0b00 | 0x1 | CS_RS[7] CS_LF[6] CS_LP[5] RDI[bit4] REI[Bit3:0] | Resv[7:2] Period [1:0] | 0xC [bit7:4] | 0x00 [bit3:0] | Resv | BIP | Seq [bit 7:4] | CRC4 |

-continued

| OAM function | Type definition | Sending priority | OAM type | Descriptions |
|---|---|---|---|---|
| 2DMR | 0x14 | Low | Multi-block | Two-way delay response block, configured to respond to the two-way delay measurement message |
| CS | 0x15 | Low | Single-block | CS indication block, configured to indicate a CS type |

Figure 13:
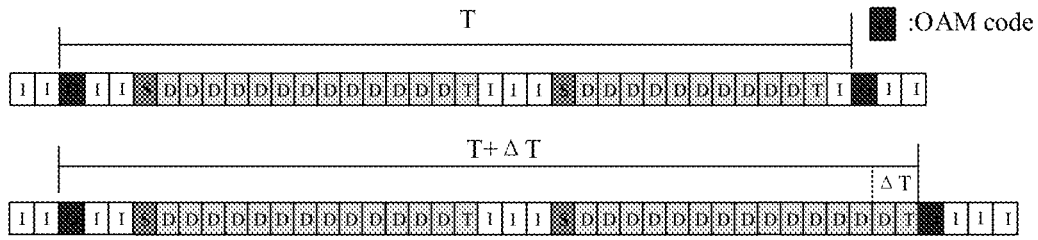
FIG. 13 is a first schematic diagram of replacing an idle block with an OAM block according to an embodiment of the disclosure.

During specific implementation, when different types of OAM messages are sent, the OAM message with the first sending priority is sent at first, and then the OAM message with the second sending priority is sent. When OAM messages with the same sending priority are sent, the next OAM message may be sent only after the previous OAM message is completely sent. A specific rule may be shown in FIG. 13.

All the OAM blocks are inserted to replace idle blocks without changing integrity of a service message. T is an absolute cycle, and an offset of a previous block may not influence sending time of a subsequent block.

Figure 14:
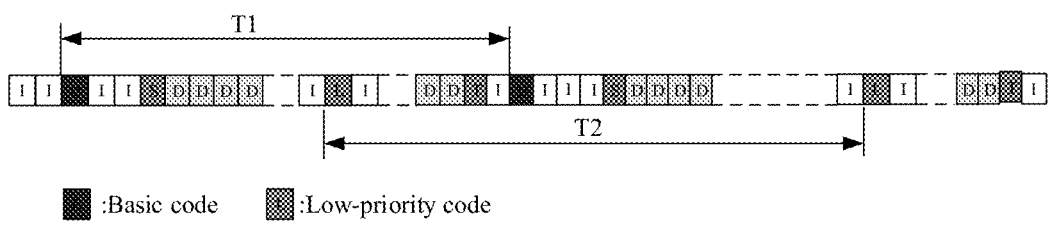
FIG. 14 is a second schematic diagram of replacing an idle block with an OAM block according to an embodiment of the disclosure.

The cycle of the OAM block may be shown in FIG. 14. The OAM blocks are inserted according to their own cycles, and different OAM blocks are independent of one another.

In case of a conflict that multiple OAM blocks are required to be inserted, the following rules may be adopted to resolve the conflict.

Figure 15:
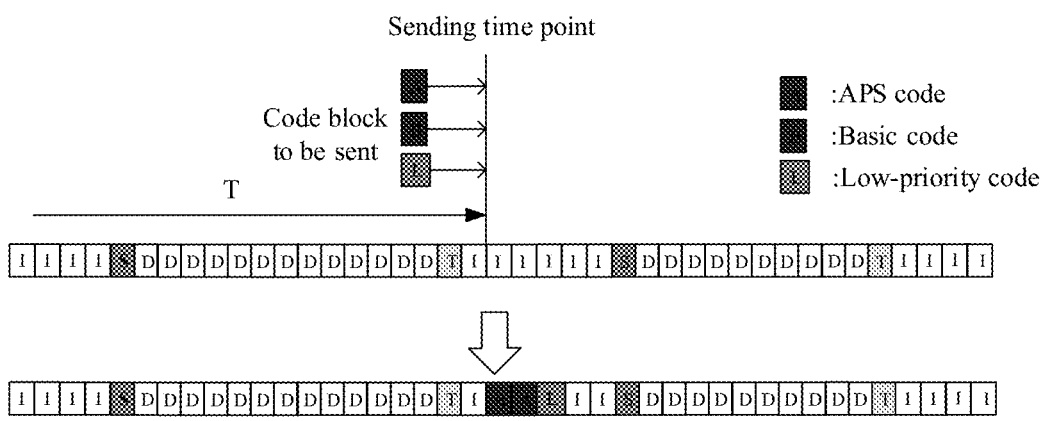
FIG. 15 is a first schematic diagram of replacing an idle block with an OAM block according to an embodiment of the disclosure.
Figure 16:
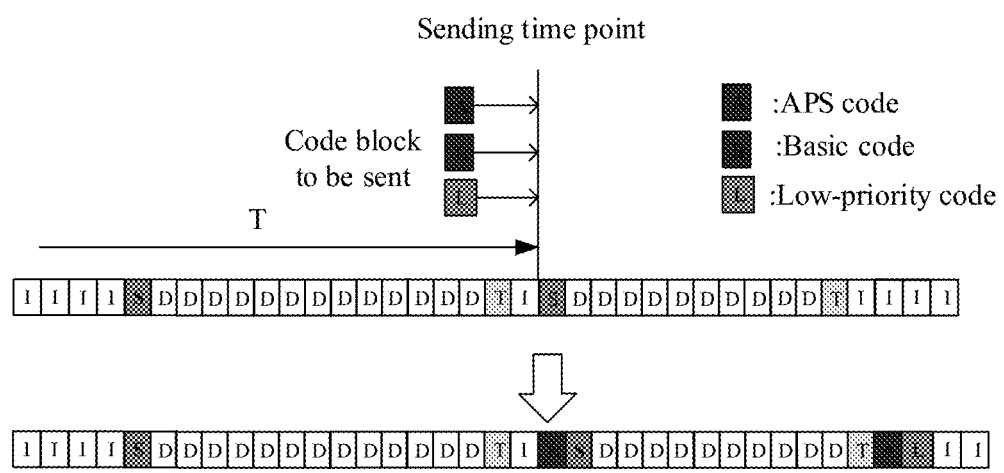
FIG. 16 is a second schematic diagram of replacing an idle block with an OAM block according to an embodiment of the disclosure.

In FIG. 15 and FIG. 16, a sending priority of a block A is higher than a sending priority of a block B, and the sending priority of the block B is higher than a sending priority of a block L. Each of the block A, the block B and the block L is an OAM block.

Conflict Processing Rule 1

As shown in FIG. 15, when the number of idle blocks is not less than the number of the OAM blocks required to be inserted, all the OAM blocks required to be inserted are sequentially inserted into the idle blocks according to time sequences. Therefore, in FIG. 15, the block L, the block A and the block B are sequentially inserted according to time sequences.

Conflict Processing Rule 2

As shown in FIG. 16, when the number of the idle blocks is less than the number of the OAM blocks required to be inserted, the OAM blocks with high sending priorities are preferably inserted into the idle blocks according to sending priorities. Therefore, in FIG. 16, the block A is inserted at first, then the block B is inserted, and finally, the block L is inserted.

The OAM block may include a basic block and an extended block modified or extended based on the basic block.

A format of the basic block may be shown in the following table.

Each field of the basic block may be defined as follows.

| Field | Position | Field descriptions | Value |
|---|---|---|---|
| Resv | D1[bit 7: 6] | Reserved | 0x0: reserved for subsequent extension |
| Type | D1[bit 5: 0] | OAM type | 0x1: representing that the OAM block type is a basic block |
| CS_RF | D2[bit 7] | Client signal remote failure | 0x1: client signal remote failure<br>0x0: representing no client signal remote failure |
| CS_LF | D2[bit 6] | Client signal local failure | 0x1: remote signal local failure<br>0x0: representing no client signal local failure |
| CSF_LPI | D2[bit 5] | Client signal low-power indication | 0x1: client signal low-power indication<br>0x0: representing no client signal low-power indication |
| RDI | D2[bit 4] | Remote defect indication | 0x1: representing remote defect indication<br>0x0: representing no remote defect |
| REI | D2[bit 3: 0] | Remote error indication | 0x0~0x7: representing the number of detected errors |
| BIP | D5[bit 7: 0] | Block BIP check | Representing BIP check information in the block, configured to check an error check result of the second BIP check interval |
| Seq | D6[bit 3: 0] | Sequence number | 0x0~0x15: supporting configuration of two modes<br>1: cyclic sequence number (default)<br>Fixed sequence number, the sequence number value may be configured |
| CRC4 | D6[bit 7: 4] | CRC | CRC result of the OAM block |

A sending priority of the basic block is the first sending priority.

The basic block may be an OAM block that is transmitted according to a cycle, and a minimum cycle interval is 16K blocks and may be configured to be 64K blocks, 256K blocks or 512K blocks. A block corresponds to a constant time length.

The basic block may be applied in the following manner.

Under the circumstance that a CS of the FlexE channel is detected to have an LF, CS_LF is set to be 0x1; after the CS gets normal, CS_LF is set to be 0x0; and when CS_LF is configured to indicate the LF of the client layer of the SPN, it is replaced with IDLE, and a destination restores the LF.

Under the circumstance that the CS of the FlexE channel is detected to have an RF, CS_RF is set to be 0x1; and after the CS gets normal, CS_RF is set to be 0x0, and when CS_RF is configured to indicate the RF of the client layer of the SPN, it is replaced with IDLE, and the destination restores the RF.

When CSF LPI is configured to indicate LIP of the client layer of the SPN, it is replaced with IDLE, and the destination restores LPI.

After the FlexE channel detects a failure, RDI in the basic block of an opposite direction is set to be 0x1, and after the failure disappears, RDI is set to be 0x0.

After the FlexE channel detects BIP errors, REI of the opposite direction contains the number of the detected errors.

A CC/BIP block contains a check result of a second BIP check interval, and a data block, IDLE and Orderset between two BIP overhead blocks are all required to participate in BIP check.

In some embodiments, LIP does not participate in BIP check, and the OAM block of the SPN channel supports configuration about whether to participate in BIP check or not. A BIP8 manner is adopted for block check. A check rule is as follows:

an APS block executing APS (APS protocol).

A block format of the APS block may be defined as follows.

APS is configured to transmit information of a failure condition, a protection switching state and the like between maintenance endpoints to coordinate a protection switching operation to realize a linear protection function and improve network reliability. The format of the APS code block is shown in the following table.

| Field | Position | Field descriptions | Value |
|---|---|---|---|
| Resv | D1[bit 7: 6] | Reserved | 0x0: reserved for subsequent extension |
| Type | D1[bit 5: 0] | OAM type | 0x2: representing that the OAM block type is an APS block |
| APS_data[B0] | D2[bit 7: 0] | APS data field 1 | |
| APS_data[B1] | D3[bit 7: 0] | APS data field 2 | |
| APS_data[B2] | D4[bit 7: 0] | APS data field 3 | |
| APS_data[B3] | D5[bit 7: 0] | APS data field 4 | |
| Seq | D6[bit 3: 0] | Sequence number | Fixed 0x0 |
| CRC4 | D6[bit 7: 4] | CRC | CRC result of the OAM block |

APS information is as follows.

A message payload structure of the APS protocol is shown in the following table.

| Format of the OAM code block | | 10 | 0x4B | D1 | D2 | D3 | O0 | 0x00 | D4 | D5 | D6 |
|---|---|---|---|---|---|---|---|---|---|---|---|
| Type | Priority | 10 | 0x4B | ResV [bit 7:6] | TYPE [bit5:0] | Value1 [bit7:0] | Value2 [bit7:0] | 0xC [bit7:4] | 0x00 [bit3:0] | Value3 [bit7:0] | Value4 [bit7:0] | Seq [bit 7:4] | CRC4 [bit3:0] |
| APS | H | 10 | 0x4B | 0b00 | 0x2 | APS_data [B0] | APS_data[B1] | 0xC [bit7:4] | 0x00 [bit3:0] | APS_data[B2] | APS_data [B3] | 0x0 | CRC4 |

Fields of the APS block may be defined in the following table.

| APS1 | | | | | | | | APS2 | | | | | | | |
|---|---|---|---|---|---|---|---|---|---|---|---|---|---|---|---|
| 8 | 7 | 6 | 5 | 4 | 3 | 2 | 1 | 8 | 7 | 6 | 5 | 4 | 3 | 2 | 1 |
| Request/state | | | | Protection type | | | | Requested signal | | | | | | | |
| | | | | A | B | D | R | | | | | | | | |

| APS3 | | | | | | | | APS4 | | | | | | | |
|---|---|---|---|---|---|---|---|---|---|---|---|---|---|---|---|
| 8 | 7 | 6 | 5 | 4 | 3 | 2 | 1 | 8 | 7 | 6 | 5 | 4 | 3 | 2 | 1 |
| Bridged signal | | | | | | | | Reserved | | | | | | | |

The fields in the above table may be defined in the following table.

| Field | | Value | Descriptions | Sending priority |
|---|---|---|---|---|
| Request/state | | 1111 | LP | Highest |
| | | 1110 | Protection channel signal failure (SF-P) | |
| | | 1101 | Forced Switching (FS) | |
| | | 1011 | Working channel signal failure (SF-W) | |
| | | 1001 | Signal Deterioration (SD) | |
| | | 0111 | Manual Switching (MS) | |
| | | 0110 | Manual switching to work (MS-W) | |
| | | 0101 | Wait To Restore (WTR) | |
| | | 0100 | Exercise (EXER) | |
| | | 0010 | Reverse Request (RR) | |
| | | 0001 | CDNR | |
| | | 0000 | No Request (NR) | Lowest |
| | | Other reserved | | |
| Protection type | A | 0 | The APS protocol is not used | |
| | | 1 | The APS protocol is required | |
| | B | 0 | 1 + 1 (permanent bridging) | |
| | | 1 | 1: 1 (impermanent bridging) | |
| | D | 0 | Single-end switching | |
| | | 1 | Double-end switching | |
| | R | 0 | CDNR manner | |
| | | 1 | Returning manner | |
| Requested signal | | 0 | No signal | |
| | | 1 | Protected normal signal | |
| | | 2-255 | Reserved | |
| Bridged signal | | 0 | No signal | |
| | | 1 | Protected normal signal | |
| | | 2-255 | Unprotected information | |

A sending priority of the APS block is the first sending priority.

The APS block may be an OAM block that is sent according to a cycle.

After the destination detects a failure, three APS blocks are periodically and continuously inserted at an interval of 16K blocks. Under a normal circumstance, one APS block for check is sent every second.

The APS block may be applied in the following manner.
1) APS triggering condition
The APS triggering condition includes:
a) an external command: Clear, Lockout Protection (LP), Forced Switching (FS), Manual Switching (MS) and Exercise (EXER);
b) physical detection and OAM request: Signal Failure (SF) and Signal Deterioration (SD); and
c) protection state: Wait To Restore (WTR), Reverse Request (RR), CDNR and No Request (NR).
2) Sending and receiving of the APS message may include the following operations.

The APS information is inserted into a source of a protected field, transmitted through a protection channel and extracted at the destination. Reception of an intermediate channel is ignored.

During normal work, a sending cycle of the APS information is 1 s. However, when a working state changes, three pieces of APS information are required to be continuously sent immediately at an interval of about 16,384 66 bit blocks, and a corresponding operation is triggered when the first piece of correct APS information is received, so that rapid protection switching may be ensured even though one or two pieces of APS information is lost or corrupted. A sending time interval of subsequent APS information is recovered to be 1 s. If the endpoint does not receive a valid APS message, previous valid information that is received is available.

An OAM block executing CV may also be called a CV block.

A block format of the CV block may be defined as follows.

A connectivity check function works in an active mode, CV information consists of a Source Access Point Identifier (SAPI) and a Destination Access Point Identifier (DAPI), each of the SAPI and the DAPI is a character string with a length of 16 fields, and definitions about a format of the SAPI and a format of the DAPI refer to G.709.

The source and destination of the SPN channel periodically send the CV information, and a destination maintenance point monitors the information and may detect whether the SPN channel has an error connection failure or not.

| Format of the OAM code block | | 10 | 0x4B | D1 | D2 | D3 | O0 | 0x00 | D4 | D5 | D6 |
|---|---|---|---|---|---|---|---|---|---|---|---|
| Type | Priority | 10 | 0x4B | Resv [bit7:6] | TYPE [bit5:0] | Value 1 [bit7:0] | Value2 [bit7:0 | 0xC [bit7:0] | 0x00 [bit3:0] | Value3 [bit7:0] | Value 4 [bit7:0] | Seq [bit7:4] | CRC4 [bit3:0] |
| CV | L | 10 | 0x4B | 0b00 | 0x11 | SAPI[B0] | SAPI [B1] | 0xC[bit7:4] | 0x00 [bit3:0] | SAPI [B2] | SAPI[B3] | 0x0 | CRC4 |
| | | 10 | 0x4B | 0b00 | 0x11 | SAPI[B4] | SAPI [B5] | 0xC[bit7:4] | 0x00 [bit3:0] | SAPI [B6] | SAPI[B7] | 0x1 | CRC4 |
| | | 10 | 0x4B | 0b00 | 0x11 | SAPI[B8] | SAPI [B9] | 0xC[bit7:4] | 0x00 [bit3:0] | SAPI [B10] | SAPI[B11] | 0x2 | CRC4 |
| | | 10 | 0x4B | 0b00 | 0x11 | SAPI[B12] | SAPI [B13] | 0xC[bit7:4] | 0x00 [bit3:0] | SAPI [B14] | SAPI[B15] | 0x3 | CRC4 |
| | | 10 | 0x4B | 0b00 | 0x11 | DAPI[B0] | DAPI[B1] | 0xC[bit7:4] | 0x00 [bit3:0] | DAPI[B2] | DAPI[B3] | 0x4 | CRC4 |
| | | 10 | 0x4B | 0b00 | 0x11 | DAPI[B4] | DAPI[B5] | 0xC[bit7:4] | 0x00 [bit3:0] | DAPI[B6] | DAPI[B7] | 0x5 | CRC4 |
| | | 10 | 0x4B | 0b00 | 0x11 | DAPI[B8] | DAPI[B9] | 0xC[bit7:4] | 0x00 [bit3:0] | DAPI[B10] | DAPI[B2] | 0x6 | CRC4 |
| | | 10 | 0x4B | 0b00 | 0x11 | DAPI[B12] | DAPI[B13] | 0xC[bit7:4] | 0x00 [bit3:0] | DAPI[B14] | DAPI[B15] | 0x7 | CRC4 |

The multi-block manner is adopted to carry the CV block. When Seq is 0x0, 0x1, 0x2 and 0x3, a contained value represents the SAPI. When Seq is 0x4, 0x5, 0x6 and 0x7, the contained value represents the DAPI.

Fields of the CV block may be defined in the following table.

| Field | Position | Field descriptions | Value |
|---|---|---|---|
| Type | D1[bit 5: 0] | OAM type | 0x11: representing that the OAM block is of a CV type |
| SAPI[4i]/ DAPI[4i] | D2[bit 7: 0] | SAPI or DAPI | Arbitrary |
| SAPI[4i + 1]/ DAPI[4i + 1] | D3[bit 7: 0] | SAPI or DAPI | Arbitrary |

-continued

| Field | Position | Field descriptions | Value |
|---|---|---|---|
| SAPI[4i + 2]/ DAPI[4i + 1] | D4[bit 7: 0] | SAPI or DAPI | Arbitrary |
| SAPI[4i + 3]/ DAPI[4i + 1] | D5[bit 7: 0] | SAPI or DAPI | Arbitrary |
| Seq | D6[bit: 0] | Sequence number | 0x0~0x7 |
| CRC4 | D6[bit 7: 4] | CRC | CRC result of the OAM block |

A sending priority of the CV block is the second sending priority. A sending priority degree corresponding to the second sending priority is lower than a sending priority degree corresponding to the first sending priority.

The CV block is an OAM block that is periodically sent, and a sending cycle may be a default cycle 10 s or may be set to be 1 s, 10 s and 1 min.

The CV block may be applied in the following manner.

The two ends of the FlexE channel enabling the CV function periodically send CV blocks to the opposite ends, and the SAPI and the DAPI are contained in a manner of combining multiple blocks.

The receiver, after receiving complete CV blocks of which sequence numbers are 0~7 respectively, checks the SAPI and the DAPI with a local channel, and if they are inconsistent, it is indicated that a CV error occurs and an alarm is reported. If they are consistent, it is indicated that CV succeeds and the alarm is canceled.

An OAM block executing CS may also be called a CS block.

A format of the CS block may be defined in the following table.

| Format of the OAM code block | | 10 | 0x4B | D1 | D2 | D3 | O0 | 0x00 | D4 | D5 | D6 |
|---|---|---|---|---|---|---|---|---|---|---|---|
| Type | Priority | 10 | 0x4B | ResV [bit7:6] | TYPE [bit5:0] | Value1 [bit7:0] | Value2 [bit7:0] | 0xC [bit7:4] | 0x00 [bit3:0] | Value3 [bit7:0] | Value4 [bit7:0] | Seq [bit7:4] | CRC4 [bit3:0] |
| CS | L | 10 | 0x4B | 0b00 | 0x15 | CS_Type | Resv | 0xC [bit7:4] | 0x00 [bit3:0] | Resv | Resv | 0x0 | CRC4 |

Fields of the CS block may be defined in the following table.

| Field | Position | Field descriptions | Value |
|---|---|---|---|
| Type | D1[bit 5: 0] | OAM type | 0x15: representing that the OAM block is of a CS type |
| CS_Type | D2[bit 7: 0] | CS type | 0'b0000: channel unloaded<br>0'b0001: Ethernet service<br>0'b0010: SDH service<br>0'b0011: FC service<br>0'b0100: CPRI service<br>Other reservation, the four higher bits reserved |
| Seq | D6[bit 7: 4] | Sequence number | Fixed 0x0 |
| CRC4 | D6[bit 3: 0] | CRC | CRC result of the OAM block |

A sending priority of the CS block is the second sending priority. The CS block is an OAM block that is periodically sent. A cycle thereof may be defined as follows: the CS block is sent immediately when a CS changes, and then a relatively long cycle (10 s as a default) is maintained. The CV block is sent periodically, and the cycle may be set to be is, 10 s and 1 min.

An OAM block executing 1DM may be called a 1DM block.

A format of the 1DM block may be defined in the following table.

| Format of the OAM code block | | 10 | 0x4B | D1 | D2 | D3 | O0 | 0x00 | D4 | D5 | D6 |
|---|---|---|---|---|---|---|---|---|---|---|---|
| Type | Priority | 10 | 0x4B | Resv [bit 7:6] | TYPE [bit5:0] | Value1 [bit7:0] | Value2 [bit7:0] | 0xC [bit7:4] | 0x00 [bit3:0] | Value3 [bit7:0] | Value4 [bit7:0] | Seq [bit 7:4] | CRC4 [bit3:0] |
| 1DM | L | 10 | 0x4B | 0b00 | 0x12 | Tx_f_TS[B0] | Tx_f_TS[B1] | 0xC [bit7:4] | 0x00 [bit3:0] | Tx_f_TS[B2] | Tx_f_TS[B3] | 0x0 | CRC4 |
| | | 10 | 0x4B | 0b00 | 0x12 | Tx_f_TS[B4] | Tx_f_TS[B5] | 0xC [bit7:4] | 0x00 [bit3:0] | Tx_f_TS[B6] | Tx_f_TS[B7] | 0x1 | CRC4 |

The multi-block manner is adopted for the 1DM block. When Seq is 0x0, a contained Value represents four lower bytes of a timestamp. When Seq is 0x1, the contained Value represents four higher bytes of the timestamp. It is to be noted that B0 is a lowest field of the timestamp.

Fields of the 1DM block may be defined in the following table.

| Field | Position | Field descriptions | Value |
|---|---|---|---|
| Type | D1[bit 5: 0] | OAM type | 0x12: representing that the OAM block is of a 1DM type |
| Tx-f-TS[0]/ Tx-f-TS[4] | D2[bit 7: 0] | Timestamp | Representing the field corresponding to the timestamp |
| Tx-f-TS[0]/ Tx-f-TS[4] | D3[bit 7: 0] | Timestamp | Representing the field corresponding to the timestamp |
| Tx-f-TS[0]/ Tx-f-TS[4] | D4[bit 7: 0] | Timestamp | Representing the field corresponding to the timestamp |
| Tx-f-TS[0]/ Tx-f-TS[4] | D5[bit 7: 0] | Timestamp | Representing the field corresponding to the timestamp |
| Seq | D6[bit 3: 0] | Sequence number | 0x0~0x1 |
| CRC4 | D6[bit 7: 4] | CRC | CRC result of the OAM block |

A sending priority of the 1DM block is the second sending priority, the 1DM block is an OAM block that is periodically sent, and a cycle may be a default cycle 10 s or may be set to be 1 s, 10 s and 1 min. On-demand enabling is supported.

The 1DM block may be applied in the following manner.

A 1DM sender writes a local timestamp into a timestamp field of a 1DM message.

A 1DM receiver, after receiving the 1DM block, records a local timestamp as a 1DM receiving timestamp and calculates a one-way delay value by "1DM receiving timestamp-1DM sending timestamp".

An OAM block executing 2DMM may be called a 2DMM block.

A block format of the 2DMM block may be defined in the following table.

The multi-block manner may be adopted to carry the 2DMM block. When Seq is 0x0, a contained value represents four lower bytes of a timestamp. When Seq is 0x1, the contained value represents four higher bytes of the timestamp.

Fields of the 2 mM block may be defined in the following table.

| Field | Position | Field descriptions | Value |
|---|---|---|---|
| Type | D1[bit 5: 0] | OAM type | 0x13: representing that the OAM block is of a 2DMM type |
| Tx-f-TS[0]/ Tx-f-TS[4] | D2[bit 7: 0] | Timestamp | Representing the field corresponding to the timestamp |
| Tx-f-TS[0]/ Tx-f-TS[4] | D3[bit 7: 0] | Timestamp | Representing the field corresponding to the timestamp |
| Tx-f-TS[0]/ Tx-f-TS[4] | D4[bit 7: 0] | Timestamp | Representing the field corresponding to the timestamp |
| Tx-f-TS[0]/ Tx-f-TS[4] | D5[bit 7: 0] | Timestamp | Representing the field corresponding to the timestamp |
| Seq | D6[bit 3: 0] | Sequence number | 0x0~0x1 |
| CRC4 | D6[bit 7: 4] | CRC | CRC result of the OAM block |

A sending priority of the 2DMM block may be the second sending priority, the 2DMM block may be an OAM block that is periodically sent, and a cycle may be a default cycle 1s and may also be set to be 1 s, 10 s and 1 min. On-demand enabling is supported.

An OAM block executing 2DMR may be called a 2DMR block.

A format of the 2DMR block may be defined in the following table.

| | | Format of the OAM code block | 10 | 0x4B | D1 | D2 | D3 | O0 |
|---|---|---|---|---|---|---|---|---|
| Type | Priority | | 10 | 0x4B | Resv [bit 7:6] | TYPE [bit5:0] | Value1 [bit7:0] | Value 2 [bit7:0] | 0xC [bit7:4] |
| 2DMM | L | | 10 | 0x4B | 0b00 | 0x13 | Tx_f_TS[B0] | Tx_f_TS[B1] | 0xC [bit7:4] |
| | | | 10 | 0x4B | 0b00 | 0x13 | Tx_f_TS[B4] | Tx_f_TS[B5] | 0xC [bit7:4] |

| | | Format of the OAM code block | 0x00 | D4 | D5 | | D6 |
|---|---|---|---|---|---|---|---|
| Type | Priority | | 0x00 [bit3:0] | Value 3 [bit7:0] | Value4 [bit7:0] | Seq [bit 7:4] | CRC4 [bit3:0] |
| 2DMM | L | | 0x00 [bit3:0] | Tx_f_TS[B2] | Tx_f_TS[B3] | 0x0 | CRC4 |
| | | | 0x00 [bit3:0] | Tx_f_TS[B6] | Tx_f_TS[B7] | 0x1 | CRC4 |

| Format of the OAM code block | | 10 | 0x4B | | D1 | D2 | | D3 | O0 |
|---|---|---|---|---|---|---|---|---|---|
| Type | Priority | 10 | 0x4B | ResV [bit 7:6] | TYPE [bit5:0] | Value1 [bit7:0] | | Value2 [bit7:0] | 0xC [bit7:4] |
| 2DMR | L | 10 | 0x4B | 0b00 | 0x14 | Tx_f_TS[B0] | | Tx_f_TS[B1] | 0xC [bit7:4] |
| | | 10 | 0x4B | 0b00 | 0x14 | Tx_f_TS[B4] | | Tx_f_TS[B5] | 0xC [bit7:4] |
| | | 10 | 0x4B | 0b00 | 0x14 | Rx_b_TS[B0] | | Rx_b_TS[B1] | 0xC [bit7:4] |
| | | 10 | 0x4B | 0b00 | 0x14 | Rx_b_TS[B4] | | Rx_b_TS[B5] | 0xC [bit7:4] |
| | | 10 | 0x4B | 0b00 | 0x14 | Tx_b_TS[B0] | | Tx_b_TS[B1] | 0xC [bit7:4] |
| | | 10 | 0x4B | 0b00 | 0x14 | Tx_b_TS[B4] | | Tx_b_TS[B5] | 0xC [bit7:4] |

| Format of the OAM code block | | 0x00 | | D4 | D5 | | D6 | |
|---|---|---|---|---|---|---|---|---|
| Type | Priority | 0x00 [bit3:0] | | Value3 [bit7:0] | Value4 [bit7:0] | Seq [bit 7:4] | | CRC4 [bit3:0] |
| 2DMR | L | 0x00 [bit3:0] | | Tx_f_TS[B2] | Tx_f_TS[B3] | 0x0 | | CRC4 |
| | | 0x00 [bit3:0] | | Tx_f_TS[B6] | Tx_f_TS[B7] | 0x1 | | CRC4 |
| | | 0x00 [bit3:0] | | Rx_b_TS[B2] | Rx_b_TS[B3] | 0x2 | | CRC4 |
| | | 0x00 [bit3:0] | | Rx_b_TS[B6] | Rx_b_TS[B7] | 0x3 | | CRC4 |
| | | 0x00 [bit3:0] | | Tx_b_TS[B2] | Tx_b_TS[B3] | 0x4 | | CRC4 |
| | | 0x00 [bit3:0] | | Tx_b_TS[B6] | Tx_b_TS[B7] | 0x5 | | CRC4 |

The multi-block manner is adopted to bear 2DMR.

1) When Seq is 0x0, a contained value represents four lower bytes of a forward sending timestamp, and when Seq is 0x1, the contained value represents four higher bytes of the forward sending timestamp.

2) When Seq is 0x2, the contained value represents four lower bytes of a backward receiving timestamp, and when Seq is 0x3, the contained value represents four higher bytes of the backward receiving timestamp.

3) When Seq is 0x4, the contained value represents four lower bytes of a backward sending timestamp, and when Seq is 0x5, the contained value represents four higher bytes of the backward sending timestamp.

Fields of the 2DMR block may be defined in the following table.

| Field | Position | Field descriptions | Value |
|---|---|---|---|
| Type | D1[bit 5: 0] | OAM type | 0x14: representing that the OAM block is of a 2DMR type |
| Tx_f_TS[B0]/ Tx_f_TS[B4]/ Rx_b_TS[B0]/ Rx_b_TS[B4]/ Tx_b_TS[B0]/ Tx_b_TS[B4]/ | D2[bit 7: 0] | Timestamp | Tx_f_TS: forward sending timestamp Rx_b_TS: backward receiving timestamp Tx_b_TS: backward sending timestamp |
| Tx_f_TS[B1]/ Tx_f_TS[B5]/ Rx_b_TS[B1]/ Rx_b_TS[B5]/ Tx_b_TS[B1]/ Tx_b_TS[B5]/ | D3[bit 7: 0] | Timestamp | Tx_f_TS: forward sending timestamp Rx_b_TS: backward receiving timestamp Tx_b_TS: backward sending timestamp |
| Tx_f_TS[B2]/ Tx_f_TS[B6]/ | D4[bit 7: 0] | Timestamp | Tx_f_TS: forward sending timestamp |
| Rx_b_TS[B2]/ Rx_b_TS[B6]/ Tx_b_TS[B2]/ Tx_b_TS[B6]/ | | | Rx_b_TS: backward receiving timestamp Tx_b_TS: backward sending timestamp |
| Tx_f_TS[B3]/ Tx_f_TS[B7]/ Rx_b_TS[B3]/ Rx_b_TS[B7]/ Tx_b_TS[B3]/ Tx_b_TS[B7]/ | D5[bit 7: 0] | Timestamp | Tx_f_TS: forward sending timestamp Rx_b_TS: backward receiving timestamp Tx_b_TS: backward sending timestamp |
| Seq | D6[bit 7: 4] | Sequence number | 0x0~0x5 |
| CRC4 | D6[bit 7: 4] | CRC | CRC result of the OAM block |

In the above table, the forward sending timestamp is a timestamp of a sending moment of sending from the sender TX, the backward receiving timestamp is a timestamp of a receiving moment when the 2DMM block arrives at the receiver RX, and the backward sending timestamp is a timestamp of a sending moment when the receiver returns the 2DMR block to the sender.

A sending priority of the 2DMR block is the second sending priority, may be an OAM block that is periodically sent, and may also not be an OAM block that is periodically sent. For example, it may be sent immediately when the 2DMM block is received.

The 2DMR block may be applied in the following manner.

1) A two-way delay measurement initiator sends a DMM block containing a local timestamp.

2) A two-way delay reflector receives the DMM block, copies the timestamp in the DMM to a forward sending timestamp of a DMR message and writes a local receiving timestamp and a local sending timestamp into the DMR message.

3) The two-way delay reflector sends the DMR message to the initiator.

4) The initiator, after receiving the DMR block, calculates a two-way delay value by (DMR receiving timestamp-DMM sending timestamp/Tx_f_TS)–(DMR sending timestamp/Tx_b_TS-DMM receiving timestamp/Rx_b_TS).

An OAM block executing BIP8 may be a BIP8 block.

BIP8 is configured to detect signal quality of the client channel, and a BIP8 calculation result is sent averagely at an interval of 16,284 66 bit code blocks. BIP8 calculation covers all code blocks from a first new block after previous BIP8 information to the end of a present BIP8 code block, including S blocks, D blocks, T blocks, O blocks, idle blocks and the like. Each BIP calculation result is loaded in a BIP code block after the next BIP code block (the third code block).

The OAM block of the SPN channel layer participates in BIP check as a default, and may be configured not to participate in BIP check. OAM may be recognized according to characteristic information of the OAM (0x4B+0xC).

A BIP8 calculation process is as follows.

In a first step, a BIP8 content of each code block is calculated, exclusive or operation is performed bitwise on 8 bits of a seventh byte in a code block to obtain a BIP [7] content, exclusive or operation is performed bitwise on 8 bits of a sixth byte in the code block to obtain a BIP[6] content, and exclusive or operation is performed on bits of other bytes in the same manner until exclusive or operation is performed bitwise on 8 bits of a 0th byte in the code block to obtain a BIP[0] content.

In a second step, exclusive or operation is performed bitwise on BIP information values corresponding to all code blocks in a cycle to obtain a final BIP8 value.

In some embodiments provided by the application, it is to be understood that the disclosed device and method may be implemented in another manner. The device embodiment described above is only schematic, and for example, division of the units is only logic function division, and other division manners may be adopted during practical implementation. For example, multiple units or components may be combined or integrated into another system, or some characteristics may be neglected or not executed. In addition, coupling or direct coupling or communication connection between each displayed or discussed component may be indirect coupling or communication connection, implemented through some interfaces, of the device or the units, and may be electrical and mechanical or adopt other forms.

The units described as separate parts may or may not be physically separated, and parts displayed as units may or may not be physical units, and namely may be located in the same place, or may also be distributed to multiple network units. Part of all of the units may be selected according to a practical requirement to achieve the purposes of the solutions of the embodiments.

In addition, each functional unit in each embodiment of the disclosure may be integrated into a processing module, each unit may also serve as an independent unit and two or more than two units may also be integrated into a unit. The integrated unit may be implemented in a hardware form and may also be implemented in form of hardware and software functional unit.

Those of ordinary skill in the art should know that all or part of the operations of the method embodiment may be implemented by related hardware instructed through programs, the programs may be stored in a computer-readable storage medium, and the programs are executed to execute the operations of the method embodiment. The storage medium includes: various media capable of storing program codes such as a mobile storage device, a ROM, a RAM, a magnetic disk or a compact disc.

The above is only the specific implementation mode of the disclosure and not intended to limit the scope of protection of the disclosure. Any variations or replacements apparent to those skilled in the art within the technical scope disclosed by the disclosure shall fall within the scope of protection of the disclosure. Therefore, the scope of protection of the disclosure shall be subject to the scope of protection of the claims.

The invention claimed is:

1. An Operation Administration and Maintenance (OAM) message transmission method, comprising: acquiring an OAM block encapsulated according to an encapsulation format of the O block, wherein the O block comprises 8 bytes, namely zeroth to seventh bytes respectively, and a message content of an OAM message is added only into the first to third bytes and fifth to seventh bytes of the O block; replacing an idle block in a data stream with the OAM block; and sending the data stream containing the OAM block.

2. The method of claim 1, wherein
the OAM block comprises at least one of a first-type OAM block that is sent according to a cycle or a second-type OAM block that is sent on demand.

3. The method of claim 2, wherein
replacing the idle block in the data stream with the OAM block comprises at least one of:
when a sending moment of the first-type OAM block is reached according to the cycle and the idle block exists in the data stream, replacing the idle block with the first-type OAM block;
when the sending moment of the first-type OAM block is reached according to the cycle and the idle block does not exist in the data stream, awaiting a next idle block of the data stream, and replacing the next idle block with the first-type OAM block; or
when the second-type OAM block that is sent on demand is sent, replacing any one idle block in the data stream with the second-type OAM block.

4. The method of claim 2, wherein
the first-type OAM block is an OAM block generated based on daily periodic maintenance; and
the second-type OAM block is an OAM block generated based on a triggering event or an OAM block generated based on an instruction.

5. The method of claim 4, wherein
the first-type OAM block comprises at least one of a Connectivity Check (CC) block, a signal quality check block, a Client Signal (CS) Local Failure (LF) indication block, a CS Remote Failure (RF) indication block, a CS power consumption indication block, a Remote Defect Indication (RDI) block and a Remote Error Indication (REI) block; or
the second-type OAM block comprises at least one of an Automatic Protection Switching (APS) block, a CS type indication block, a Connectivity Verification (CV)

block, a one-way delay measurement block, a two-way delay measurement block and a two-way delay measurement response block.

6. The method of claim 1, wherein
acquiring the OAM block generated based on the OAM message comprises:
when a data length of the OAM message is not greater than a data length that the OAM block can carry, acquiring an independent OAM block.

7. The method of claim 1, wherein
acquiring the OAM block generated based on the OAM message comprises:
when a data length of the OAM message is greater than the data length that the OAM block can carry, acquiring multiple associated OAM blocks corresponding to the OAM message, each associated OAM block containing part of the message content of the OAM message and each associated OAM block containing a sequence number corresponding to the message content in the associated OAM block.

8. The method of claim 1, wherein
replacing the idle block in the data stream with the OAM block comprises: selecting the OAM block to replace the idle block in combination with at least one of a time sequence of the OAM block or a sending priority of the OAM block according to a predetermined strategy.

9. The method of claim 8, wherein
selecting the OAM block to replace the idle block in combination with at least one of the time sequence of the OAM block or the sending priority of the OAM block according to the predetermined strategy comprises:
if a number of OAM blocks is not greater than a number of idle blocks, sequentially selecting the OAM blocks to replace the idle blocks according to time sequences.

10. The method of claim 8, wherein
replacing the idle block with the OAM block in combination with at least one of the time sequence of the OAM block or the sending priority of the OAM block according to the predetermined strategy comprises at least one of:
if a number of the OAM blocks is greater than a number of the idle blocks, selecting the OAM blocks with high sending priorities to replace the idle blocks according to different sending priorities;
or,
if a number of the OAM blocks is greater than a number of the idle blocks and the OAM blocks to be sent have a same priority, selecting the OAM blocks to replace the idle blocks according to the time sequences.

11. The method of claim 1, wherein
the OAM block comprises at least one of the following fields:
a type field, configured to indicate an OAM block type;
a sending priority field, configured to indicate the sending priority of the OAM block;
a sequence number field, configured to indicate the sequence number of the OAM block;
a first check field, configured to carry a first check code, the first check code being configured to check the OAM block; and
a message field, configured to carry the message content of the OAM message.

12. The method of claim 1, wherein
acquiring the OAM block generated based on the OAM message comprises:
acquiring an OAM block generated based on a second check code and the OAM message, the second check code being generated based on a code block of an nth transmission cycle, the acquired OAM block being configured to replace an idle block of an (n+m)th transmission cycle, n being a positive integer and m being a positive integer.

13. The method of claim 12, wherein
the OAM block comprises a first-type OAM block that is sent according to at least one of the cycle or a second-type OAM block that is sent on demand; and
acquiring the OAM block generated based on the second check code and the OAM message comprises:
acquiring the first-type OAM block generated based on the second check code and the OAM message.

14. An Operation Administration and Maintenance (OAM) message transmission method, comprising: receiving a data stream; and extracting an OAM block encapsulated according to an encapsulation format of the O block from the data stream, the OAM block being a code block replacing an original idle block in the data stream, wherein the O block comprises 8 bytes, namely zeroth to seventh bytes respectively, and only the first to third bytes and fifth to seventh bytes of the O block contain a message content of an OAM message.

15. The method of claim 14, further comprising:
when the OAM block comprises a sequence number, assembling contents of multiple OAM blocks according to sequence numbers to obtain an OAM message corresponding to the multiple associated OAM blocks.

16. The method of claim 14, further comprising:
extracting a second check code from an OAM block of an (n+m)th transmission cycle;
comparing the second check code and a third check code locally generated based on a code block of an nth transmission cycle; and
determining transmission quality of the nth transmission cycle according to a comparison result.

17. A transmission device, comprising a transceiver, a memory, a processor and computer programs stored in the memory and executed by the processor, wherein the processor is connected with the transceiver and the memory respectively, and is configured to execute the computer programs to implement the following operations: acquiring an OAM block encapsulated according to an encapsulation format of the O block, wherein the O block comprises 8 bytes, namely zeroth to seventh bytes respectively, and a message content of an OAM message is added only into the first to third bytes and fifth to seventh bytes of the O block; replacing an idle block in a data stream with the OAM block; and sending the data stream containing the OAM block.

18. The method of claim 1, wherein the idle block locates between two adjacent transmission cycles.

* * * * *